United States Patent
Kasuya et al.

(10) Patent No.: US 9,168,813 B2
(45) Date of Patent: Oct. 27, 2015

(54) DOOR ASSEMBLY FOR VEHICLE

(75) Inventors: Takashi Kasuya, Wako (JP); Tomohide Sawada, Wako (JP); Toshiya Ohba, Wako (JP); Daisuke Tsuburaoka, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 9 days.

(21) Appl. No.: 14/110,216

(22) PCT Filed: Apr. 6, 2012

(86) PCT No.: PCT/JP2012/059541
§ 371 (c)(1),
(2), (4) Date: Oct. 28, 2013

(87) PCT Pub. No.: WO2012/141102
PCT Pub. Date: Oct. 18, 2012

(65) Prior Publication Data
US 2014/0049067 A1 Feb. 20, 2014

(30) Foreign Application Priority Data

Apr. 12, 2011 (JP) ................................. 2011-088483
Apr. 12, 2011 (JP) ................................. 2011-088503
Apr. 12, 2011 (JP) ................................. 2011-088531

(51) Int. Cl.
*B60J 5/04* (2006.01)
*B60J 10/04* (2006.01)
(Continued)

(52) U.S. Cl.
CPC ........ *B60J 5/04* (2013.01); *B60J 5/0415* (2013.01); *B60J 10/0031* (2013.01);
(Continued)

(58) Field of Classification Search
CPC .......... B60J 10/08; B60J 5/04; B60J 10/0031; B60J 10/0062; B60J 10/085; B60J 5/0415; B60J 10/0045; B60R 13/043; E06B 7/14; E06B 7/2303
USPC ................. 296/146.5, 146.9; 49/476.1, 498.1
See application file for complete search history.

(56) References Cited

U.S. PATENT DOCUMENTS

2011/0012388 A1* 1/2011 Iida et al. ................... 296/146.9

FOREIGN PATENT DOCUMENTS

| JP | S60-157425 | 10/1985 |
|----|------------|---------|
| JP | 64-3687    | 2/1989  |

(Continued)

OTHER PUBLICATIONS

International Search Report dated Jun. 22, 2012.
European Search Report dated Jul. 14, 2014, 6 pages.

*Primary Examiner* — Glenn Dayoan
*Assistant Examiner* — Melissa A Black
(74) *Attorney, Agent, or Firm* — Rankin, Hill & Clark LLP

(57) ABSTRACT

A door assembly (40) for a vehicle, including a vehicle door (12) for opening and closing a door opening in the vehicle body. The door comprises a door body (15), an outer cover member (27) which covers at least a part of the outer surface (53) of the door outer panel (21) of the door body, and a seal member (28). The outer cover member comprises an outer cover body (165) which covers the outer surface of the door outer panel, an extension section (164) which is extended further toward the outside than an edge (163) of the door body, and a closed cross-section section (166) which is formed in a closed cross-sectional shape on the rear surface (177) of the extension section. The seal member is attached to the closed cross-section section.

28 Claims, 24 Drawing Sheets

(51) Int. Cl.
*B60R 13/04* (2006.01)
*B60J 10/00* (2006.01)
*B60J 10/08* (2006.01)
*E06B 7/14* (2006.01)
*E06B 7/23* (2006.01)

(52) U.S. Cl.
CPC ......... *B60J 10/0045* (2013.01); *B60J 10/0062* (2013.01); *B60J 10/08* (2013.01); *B60J 10/085* (2013.01); *B60R 13/043* (2013.01); *E06B 7/14* (2013.01); *E06B 7/2303* (2013.01)

(56) References Cited

FOREIGN PATENT DOCUMENTS

| | | |
|---|---|---|
| JP | 04-67108 | 6/1992 |
| JP | H05-062310 | 8/1993 |
| JP | 07-205731 | 8/1995 |
| JP | 08-142673 | 6/1996 |
| JP | 2007-186093 | 7/2007 |
| JP | 2008-184116 | 8/2008 |

* cited by examiner

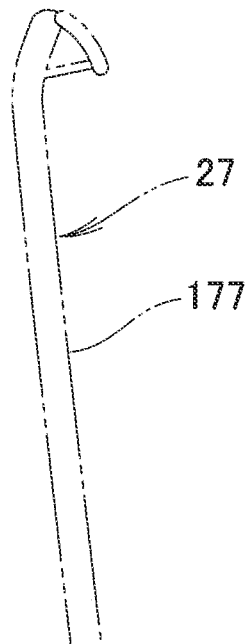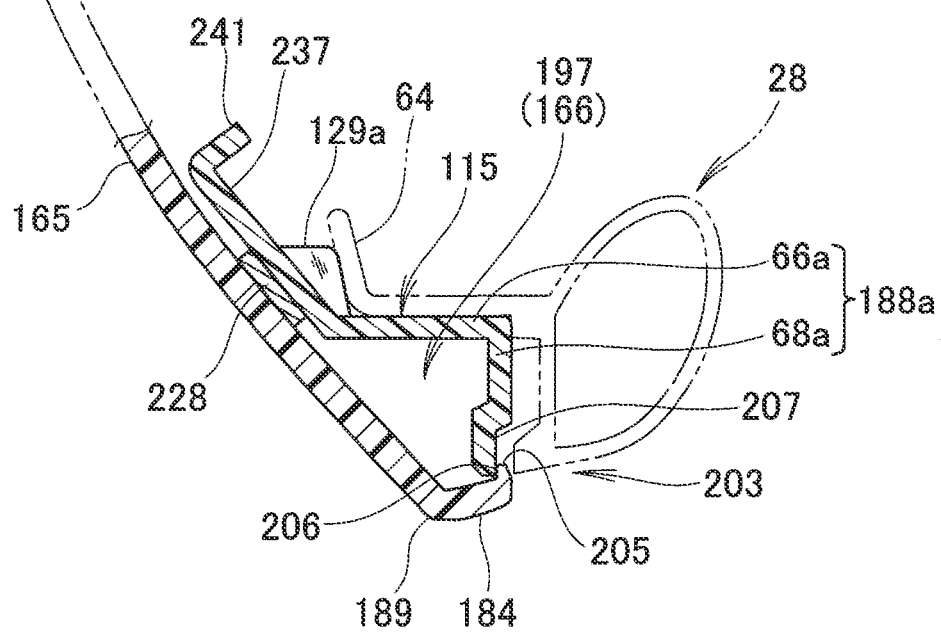
FIG.19

DOOR ASSEMBLY FOR VEHICLE

TECHNICAL FIELD

The present invention relates to a door assembly for a vehicle or vehicle door assembly having an exterior member provided on the outer surface of a vehicle door for opening and closing a door opening formed in a vehicle body.

BACKGROUND ART

In order to enhance design quality of vehicles and/or protect the outer surfaces of the vehicles, various exterior members are provided on parts of the upper surfaces of vehicle bodies. For similar purposes, exterior members are sometimes provided on the outer surfaces of vehicle doors as well. Techniques for providing an exterior member on the outer surface of a vehicle door are disclosed in Patent Literature 1 and Patent Literature 2. According to each of Patent Literature 1 and Patent Literature 2, the vehicle door on which the exterior member is provided is a side door for opening and closing a get-in/out opening (door opening) formed in the vehicle body. A lower section of the outer surface of the side door is covered with the exterior member formed of resin.

Such conventionally-known vehicle door assemblies have the following three room for improvement.

The first room for improvement is as follows. The get-in/out opening (door opening) is formed in the vehicle body in a given size in accordance with design of the vehicle. Further, it is preferable that the get-in/out have a large size to allow a passenger to get in and out to and from the vehicle. In many cases, the side door is manufactured in a different plant from the vehicle body by use of existing manufacturing facilities. In order to manufacture a large-size side door, limitations of capacities of the manufacturing equipment, for example, are often encountered. In a case where the vehicle is designed so that a large get-in/out opening is closed with a relatively small side door, arrangements have to be made such that no gap is formed in a surface direction of the door between a frame section defining the get-in/out opening and the lower end of the side door. In order to avoid, such a gas, it may be conceivable to expand downward an inner panel of the door panel. However, because the door increases in weight in such a case, there is room for improvement with a view to reducing the weight of the vehicle.

Further, in the vehicle door disclosed in Patent Literature 2, a seal member seals between a frame section defining the get-in/out opening and an edge of the side door. When the door is closed (in a closed position), the seal member is sandwiched between the frame section and the edge of the side door. Thus, reactive force acts on the edge of the side door due to the sandwiching of the seal member. If a gap exists in the surface direction of the door, no seal member can be provided on the edge of the side door.

The second room for improvement is as follows. The exterior member disclosed in Patent Literature 2 includes: a panel-shaped exterior member body covering a lower section of the outer surface of the side door; a flange section extending from the lower end of the exterior member body toward the lower edge of the side door; a panel-shaped reduced-thickness section formed integrally with the distal end of the flange section; and an inner wall formed integrally with the exterior member body via the small-thickness section. The reduced-thickness section is a section bendable in the thickness direction and generally called a reduced-thickness hinge. The inner wall is bent inward about the reduced-thickness hinge toward the reverse side of the exterior member body and joined to the reverse surface. Thus, on the lower end of the exterior member body, a closed section part having a closed sectional shape is formed with the exterior member body, the flange section and the inner wall.

Generally, the resin-made exterior member is formed by a resin-molding mold that has a gate (feed opening) formed therein for feeding molten resin into a cavity. Thus, there would be left an unwanted mark of the gate on the molded exterior member; such a mark is positioned on the reverse surface of the flange section so that it is invisible from outside the exterior member. Further, the above-mentioned inner wall is located, across the reduced-thickness hinge from the exterior member body and the flange section. Because a narrowed space is defined between the flange section and the inner wall, a flow, between the flange section and the inner wall, of the molten resin fed through the gate tends to be limited. Thus, in order to smooth the flow of the molten resin, it is preferable to provide the gate in a portion of the cavity having a relatively large space, e.g. a cavity portion corresponding to the flange section.

The vehicle doors are formed in various shapes in accordance with design of the vehicles, and a variety of shapes are required of the exterior members depending on the shapes of the vehicle doors. In some cases, the exterior member may be curved to be slightly concave or recessed inward in the vehicle width direction, while the reduced-thickness hinge is formed straight in such a manner as to be bendable. Therefore, a width of the flange section, i.e. a distance from the reduced-thickness hinge to the lower end of the exterior member body would greatly differ depending on the curved shape of the exterior member.

In the case where the exterior member is curved to be slightly concave or recessed inward in the vehicle width direction as above, the flange section has a minimum width at its middle portion in the longitudinal direction of the door (i.e., front-rear direction of the vehicle body). Thus, the gate sometimes may not be able to be provided on the flange-section-corresponding cavity portion of the cavity in the resin-molding mold. In such a case, there is no other choice but to provide the gate in a cavity portion corresponding to the exterior member body located greatly remote from the reduced-thickness hinge. Namely, there is room for improvement in order to allow the molten resin to flow uniformly throughout the entire range of the cavity. Therefore, limitations would be encountered in increasing a strength of the exterior member.

The third room for improvement is as follows. Generally, the bodies of the vehicle side doors have a drainage hole for discharging water having entered the interior of the door body, as known from Patent Literature 2 and Patent Literature 3.

In the vehicle side door disclosed in Patent Literature 2, the drainage hole and the seal member are provided in and on the lower end of the door body, respectively, and the lower section of the outer surface of the side door is covered with the exterior member. The exterior member is formed in a gutter shape such that it includes a portion positionally corresponding to the drainage hole and it covers the lower end of the lower end of the door body. More specifically, the drainage hole is formed in the bottom of the exterior member, and the seal member is a weather strip that contacts and seals the frame section of the get-in/out opening when the side door is closed and that is located closer to the interior of the vehicle than the exterior member.

Further, the vehicle side door disclosed in Patent Literature 3 includes the drainage hole, a weather strip and a seal member provided in and on the lower end of the door body. The weather strip is a member that is located closer to the interior of the vehicle than the exterior member and that contacts and seals a frame section of the get-in/out opening when the side door is closed. The seal member (parting seal), which is formed in a tubular shape and located immediately beneath the drainage hole, has a communication hole capable of introducing thereinto water discharged via the drainage hole.

However, the techniques disclosed in Patent Literature 2 and Patent Literature 3 are disadvantageous in that, if the vehicle is designed so that a large get-in/out opening is closed with a relatively small side door, a gap would be formed between the frame section defining the get-in/out opening and the lower end of the side door. Due to such a gap, no seal member can be provided on the lower edge of the side door. Besides, the drainage hole formed in the lower end of the side door would be located away from the frame section. Thus, arrangements have to be made to prevent water, discharged via the drainage hole, from entering the interior the door through the gap.

If the seal member employed in any one of the vehicle doors disclosed in Patent Literature 1 and Patent Literature 2 is mounted as-is below the drainage hole and in such a manner as to cover the drainage hole, a distance from the drainage hole to the seal member would increase. Thus, the frame section would get wet with water discharged via the drainage hole. Particularly, in cold weather regions, the water having wetted the frame section tends to easily freeze, so that the seal member may adhere to (freeze to) the frame section. Therefore, arrangements have to be made to secure enough durability of the seal member.

PRIOR ART LITERATURE

Patent Literature 1: Japanese Patent Application Laid-Open Publication No. 2007-186093
Patent Literature 2: Japanese Utility Model Publication No. SHO-64-3687
Patent Literature 3: Japanese Patent Application Laid-Open Publication No. HEI-8-142673

SUMMARY OF INVENTION

Technical Problem

It is therefore a first object of the present invention to provide a technique which can increase the size of the door opening but also avoid formation of a gap in the surface direction between the frame section defining the door opening and the door.

It is a second object of the present invention to provide a technique which can increase the strength of the exterior member.

It is a third object of the present invention to provide a technique which can increase the durability of the seal member that seals between the frame section of the get-in/out opening and the door body.

Solution to Problem

According to claim 1, there is provided a vehicle door assembly including a vehicle door for opening and closing a door opening of a vehicle body, the vehicle door comprising: a door body of a hollow shape including an outer door panel and an inner door panel; an exterior member formed of a softer material than the door body and mounted on the outer surface of the outer door panel to cover at least a part of the outer surface of the outer door panel; and a seal member capable of contacting and sealing a frame section defining the door opening, when the door is closed, the exterior member comprising; an exterior member body covering the outer surface of the outer door panel; an extension section extending from the exterior member body outwardly beyond an edge of the door body along the outer surface of the outer door panel; and a closed section part formed in a closed section shape on the reverse surface of the extension section, the seal member being mounted on the closed section part.

Preferably, as recited in claim 2, the frame section has a door-facing surface capable of facing the edge of the door body when the door is closed, and the closed section part is disposed to be positioned between the edge of the door body and the door-facing surface when the door is closed.

Preferably, as recited in claim 3, the frame section has a sealing surface extending from the door-facing surface toward the door opening, and the seal member is disposed to contact the sealing surface as the door is closed in a direction substantially perpendicular to the door opening.

Preferably, as recited in claim 4, at least a part of an inner peripheral surface of the frame section comprises a slanting wall section inclined from an end of the sealing surface closer to the door opening toward the center of the door opening and toward the interior of the vehicle. When the door is closed, the end of the sealing surface is located closer to the door-facing surface than a start point where edges of the outer door panel and the inner door panel start being superposed on each other.

Preferably, as recited in claim 5, at least a part of the outer peripheral surface of the frame section comprises a design wall section formed continuously with the door-facing surface, and the outer surface of the design wall section is shaped such that it lies substantially flush with the outer surface of the exterior member when the door is closed.

Preferably, as recited in claim 6, the closed section part has an end surface extending adjacent to an opposite side of the edge of the door body from the reverse surface of the extension section, and the seal member is mounted on the end surface of the closed section part.

Preferably, as recited in claim 7, the seal member is fixed to the closed section part by means of a seal fixing member, and the seal fixing member is engaged by the closed section part by being partly inserted in the interior of the closed section part.

Preferably, as recited in claim 8, the closed section part includes: a substantially horizontal lower plate portion disposed beneath the edge of the door body; a joining flange section extending upward from the lower plate portion and joined to the reverse surface of the exterior member body; and at least one rib formed on a corner between the lower plate portion and the joining flange section, and the seal member includes: a seal section capable of contacting and sealing the frame section; a projecting section extending from the seal section, along the upper surface of the lower plate portion, to the rib; and an outer-surface sealing section extending upward from the distal end of the projecting section. The outer-surface sealing section is sandwiched by the outer surface of the outer door panel and the rib near the lower edge of the door body.

Preferably, as recited in claim 9, the vehicle door is a door disposed to extend substantially vertically when the vehicle door is in the closed position, the door body has at least one drainage hole formed therein for discharging water having entered the interior of the door body, the drainage hole is located closer to the frame section than the lower edge of the door body when the door is closed, the seal member includes a slant section slanting in the thickness direction of the door body, and a drainage sealing section connecting integrally to the slant section, the slant section is located closer to the frame section than the drainage hole and opposed to the drainage hole and slants downward toward the extension section when the door is closed, the drainage sealing section extends from the lower end of the slant section in a direction toward the door body and extends beneath the drainage hole to the lower edge of the door body, and the exterior member includes a seal backup portion having a flat upper surface for supporting thereon the reverse surface of the drainage sealing section.

Preferably, as recited in claim 10, the seal backup portion includes a wall section extending downward from an end, located remote from the door body, of the seal backup portion, a surface of the wall section opposite from the reverse surface of the extension section being provided as a seal mounting surface, the seal member includes a seal mounting section shaped to extend along the seal mounting surface, and the seal mounting section is superposed on and mounted on the seal mounting surface.

According to claim 11, there is provided a vehicle door assembly including a vehicle door for opening and closing a door opening of a vehicle body, the vehicle door including a door body and a resin-made exterior member covering the outer surface of the door body, the exterior member including: an exterior member body covering the outer surface of the door body; a flange section extending from an edge of the exterior member body toward a peripheral edge section of the door body; a bent section formed integrally with the distal end of the flange section and bendable in the thickness direction of the flange section; an inner wall formed integrally with the bent section and bendable about the bent section toward the reverse surface of the exterior member body; and a joining flange section formed at the distal end of the inner wall and capable of being joined to the reverse surface of the exterior member body. The bent section extends straight along the distal end of the flange section, the exterior member body and the flange section together constitute a first closed section part of a closed sectional shape when the joining flange section is joined to the reverse surface of the exterior member body, a spaced-apart distance from the edge of the exterior member body to the bent section differs among portions of the exterior member body, the bent section and the inner wall are provided only in portions of the exterior member body where the spaced-apart distance is greater than a predetermined distance, an inner wall member separate from the inner wall is mounted on the reverse surface of a remaining portion where the bent section and the inner wall are not provided, and the inner wall member and the exterior member body together constitute a second closed section part of a closed sectional shape continuous with the first closed section part.

Preferably, as recited in claim 12, the inner wall member includes a superposition section superposed on the inner wall of the exterior member, and the superposition section is joined to the inner wall.

Preferably, as recited in claim 13, the joining flange section is joined to the reverse surface of the exterior member body by adhesive bonding, and the superposition section is joined to the inner wall of the exterior member by a mechanical joint.

Preferably, as recited in claim 14, the superposition section is a section located in the interior of the first closed section part and superposed on the inner wall.

Preferably, as recited in claim 15, the exterior member further includes a separate-member joining mechanism for joining the inner wall member to the exterior member body, and the separate-member joining mechanism is located near the superposition section.

Preferably, as recited in claim 16, the separate-member joining mechanism includes: a locking claw projecting from the flange section toward the inner wall member; a locking surface that is one surface of the locking claw and that faces the reverse surface of the exterior member body; and an engagement section formed on the inner wall member for locking engagement by the locking surface. The inner wall member is joined to the exterior member body by being sandwiched between the reverse surface of the exterior member body and the locking surface.

Preferably, as recited in claim 17, the engagement section is formed in a shape recessed from a surface, abutting against the locking surface, of the inner wall member toward the reverse surface of the exterior member body.

Preferably, as recited in claim 18, the exterior member further includes an end wall section extending from at least one end, in the extending direction of the bent section extending straight, of the exterior member body toward the door body, and an opening, located near the one end of the exterior member body, of the first closed section part is covered with the end wall section.

Preferably, as recited in claim 19, the exterior member further includes a body end joint section that joins the exterior member body to the door body, and the joining flange section includes an evacuation section formed in such a manner as to bypass the body end joint section, without interfering with the body end joint section, when the joining flange section is joined to the exterior member body.

Preferably, as recited in claim 20, the exterior member further includes a shield wall closing up a gap between the reverse surface of the exterior member body and the evacuation section.

According to claim 21, there is provided as vehicle door assembly including a vehicle door for opening and closing a get-in/out opening of a vehicle body, the vehicle door comprising: a door body of a hollow sectional shape; an exterior member mounted on a lower section of the outer surface of the outer door body and including an extension section extending downward beyond the lower edge of the door body; and a seal member mounted on the extension section and capable of contacting and sealing a frame section, defining the get-in/out opening, when the door is closed. The door body has at least one drainage hole for discharging water having entered the interior of the door body, the seal member includes a slant section located closer to the frame section than the drainage hole when the door is closed, and the slant section is opposed to the drainage hole and slants downward toward the extension section.

Preferably, as recited in claim 22, the drainage hole is located closer to the frame section than the lower edge of the door body when the door is closed, the seal member includes a drainage sealing section connecting integrally to the slant section, and the drainage sealing section extends from the lower end of the slant section in a direction toward the door body and extends beneath the drainage hole to the lower edge of the door body.

Preferably, as recited in claim 23, the seal member includes an outer-surface sealing section extending upward from the distal end of the drainage sealing section, and, the outer-surface sealing section is sandwiched between the outer surface of the outer door panel and the exterior member near the lower edge of the door body.

Preferably, as recited in claim 24, the exterior member includes a seal backup portion having a flat upper surface for supporting thereon the reverse surface of the drainage sealing section.

Preferably as recited in claim 25, the seal backup portion includes a wall section extending downward from an end, located remote from the door body of the seal backup portion, a surface of the wall section opposite from the reverse surface of the extension section being provided as a seal mounting surface, the seal member includes a seal mounting section shaped to extend along the seal mounting surface, and the seal mounting section is superposed on and mounted on the seal mounting surface.

Preferably, as recited in claim 26, the seal mounting section has an upper end formed integrally with a base portion of the drainage sealing section merging with the lower end of the slant section.

Preferably, as recited in claim 27, of the seal member, a seal section for contacting and sealing the frame section is a hollow seal section having a hollow sectional shape, and the hollow seal section is formed integrally to integrally include the slant section, the seal mounting section and a lower half section extending from the lower end of the seal mounting section to the upper end of the slant section.

Preferably, as recited in claim 28, the exterior member includes: a joining flange section extending upward from an end, adjacent to the reverse surface of the exterior member, of the seal backup portion and joined to the reverse surface of the exterior member; and at least one rib formed on a corner between the seal backup portion and the joining flange section. The seal member includes an outer-surface sealing section extending upward from the distal end of the drainage sealing section, and the outer-surface sealing section is sandwiched by the outer surface of the door body and the rib near the lower edge of the door body.

Advantageous Effects of Invention

According to the invention recited in claim 1, the exterior member includes the extension section extending from the exterior member body, covering the outer surface of the outer door panel, outwardly beyond the edge of the door body along the outer surface of the outer door panel. The door comprises a combination of the door body and the extension section. The door increases in its overall size due to the extension section extending outwardly beyond the edge of the door body. Thus, even where the door is limited to a small size relative to a size of the door opening, it is possible to increase the size of the door in accordance with the size of the door opening. Further, a gap between the frame section defining the door opening and the edge of the door body can be covered with the extension section.

Further, the closed section part is formed on the reverse surface of the extension section. Because the closed section part is of a closed sectional shape, it has an increased rigidity. Although the extension section is not retained directly by the door body it has an increased strength and rigidity by being reinforced with the closed sectional shape.

Further, the seal member is mounted on the closed section part. The seal member can be retained on the door firmly by means of the great-rigidity closed section part. The seal member is a member capable of contacting and sealing the frame section, defining the door opening, when the door is closed (in the closed position). Because the closed section part is disposed on the extension section extending outwardly beyond the edge of the door body, the seal member is located outwardly of the edge of the door body. Namely, the seal member can be disposed on an edge portion of the door body increased in size in accordance with the door opening. Thus, even where the door body cannot be increased in size, the size of the "entire door" can be changed by the provision of the extension section. As a result, the present invention can increase the size of the door opening and the door.

According to the invention recited in claim 2, a gap between the peripheral edge portion of the door body and the wall opposed to the door opening can be decreased by the closed section part. Thus, it is possible to restrain ran water and wind from entering the gap. Further, using the gap, it is possible to secure a sufficient sectional area of the closed section part without increasing a distance from the outer surface of the door body to the exterior member body.

According to the invention recited in claim 3, as the door is closed in a direction substantially perpendicular to the door opening, the seal member can come into contact with the sealing surface. Thus, the seal member can be pressed against the sealing surface by force produced by the closing of the door. As a result, sealability of the seal member can be increased.

According to the invention recited in claim 4, the seal member is provided on the closed section part of the exterior member, and thus, it is not necessary to provide a seal member on the door body. Thus, at least a part of the inner peripheral surface of the frame section can be formed in a shape widening in a direction from the interior of the vehicle toward the exterior of the vehicle. As a consequence, it is possible to maximize the size of a portion, adjacent to the exterior of the vehicle, of the door opening. In a case where the door opening is constructed as a get-in/out opening of the vehicle, a passenger can get in and out of the passenger compartment with an increased ease. Further, in a case where the door opening is constructed as an opening opened and closed with a tail gate, baggage carry-in and carry-out to and from a baggage compartment of the vehicle can be facilitated.

According to the invention recited in claim 5, the design wall section lies substantially flush with the outer surface of the exterior member when the door is closed, and thus, external appearance of the vehicle can be enhanced.

According to the invention recited in claim 6, when the door is closed, the end surface of the closed section part is located closer to the frame section than a peripheral edge portion of the door body. The seal member is mounted on the end surface. Because a distance between the end surface and the frame section can be reduced, the present invention can reduce the size of the seal member. Further, using a gap between the door body and the frame section, the present invention can increase the sectional area of the closed section par.

The invention recited in claim 7 can firmly retain the seal member as compared to a construction where the seal member is fixed by an adhesive agent (or adhesive tape or the like) and by a part thereof being sandwiched. Further, because the seal fixing member is engaged by the closed section part, there is no need to provide any other part dedicated to locking or engaging the seal fixing member.

According to the invention recited in claim 8, the rib is formed on the corner between the lower plate portion and the joining flange section. The provision of such a rib can restrain deformation of the lower plate portion and the joining flange section. Particularly, the provision of the rib can restrain the joining flange section from falling down in a direction where the corner changes in angle. Further, using the rib, the outer-surface sealing section can be sandwiched between the rib and the outer door panel. Thus, the outer-surface sealing section can be retained reliably by the door.

According to the invention recited, in claim 9, a flowing direction of drainage water discharged to the outside via, the drainage hole is regulated by the slant section when the door is in the closed position. Namely, the slant section can regulate the drainage water flowing direction so that the drainage water does not flow toward the interior of the vehicle beyond the seal member. Besides, because the slant section slants downward toward the extension section, it can direct the drainage water away from the frame section of the get-in/out opening. The drainage water is directed by the slant section to flow to the drainage sealing section, from which it is discharged to a road surface. Thus, when the door is in the closed position, the present invention can prevent the drainage water from flowing beyond the seal member and accumulating and freezing between the seal member and the get-in/out opening. Because the seal member can be prevented from adhering to (freezing to) the frame section of the get-in/out opening due to freezing of the drainage water, the present invention allows the seal member to have an increased durability. Further, the reverse surface of the drainage sealing section connecting integrally to the slant section is supported by the seal backup portion having a flat upper surface. Thus, the present invention allows the drainage water, directed from the slant section, to be promptly discharged to the outside without accumulating in the drainage sealing section.

According to the invention recited in claim 10, the seal member can be mounted on a substantially vertical wall section, and thus, operation for mounting the seal member can be facilitated. When the seal member has been pressed against the frame section, force input from the seal member can be received and dispersed by the wall section, so that undesired inclination and movement of the seal member can be prevented. In the case where the door opening is constructed as the get-in/out opening, the present invention can prevent the seal member from inclining upward or downward as if twisting and from moving in a vertical (up-down) direction.

According to the invention recited in claim 11, the flange section extends from the edge of the exterior member body toward the peripheral edge section of the door body, and the inner wall of the exterior member is formed at the distal end of the flange section via the bent section. The bent section and the inner wall are provided only in portions of the exterior member body where the spaced-apart distance (or width of the flange section) from the edge of the exterior member body to the bent section is greater than the predetermined distance. The joining flange section is formed at the distal end of the inner wall. With the joining flange section joined to the reverse surface of the exterior member body, the exterior member body and the inner wall of the exterior member together constitute the first closed section part of a closed sectional shape. By the provision of the first closed section part, the present invention can increase the strength of the exterior member.

On the other hand, the inner wall member, which is a separate member from the inner wall, is mounted on the reverse surface of the remaining portion where the bent section and the inner wall are not provided, and the inner wall member and the exterior member body together constitute the second closed section part of a closed sectional shape. By the provision of the second closed section part, the present invention can increase the strength of the exterior member.

The first closed section part and the second closed section part extend substantially in a series along the bent section. Namely, the first closed section part and the second closed section part are disposed to extend substantially continuously with each other. Thus, even in a portion where the inner wall cannot be formed with respect to the exterior member body, the strength of the exterior member can be increased sufficiently by the first and second closed section parts.

Further, according to the invention recited in claim 12, the superposition section provided on the inner wall member is superposed on and joined to the inner wall of the exterior member. Thus, even where there is a slight gap between ends of the first closed section part and the inner wall member, the first and second closed section parts extending substantially continuously with each other can together constitute a single "closed section part". Namely, the superposition section is located in a portion corresponding to a slight gap between ends of the inner wall member and the inner wall, so that a mounting strength of the inner wall and the inner wall member can be increased. Further, positional deviation of the inner wall member relative to the inner wall can be effectively restrained, and the first and second closed section parts can extend continuously with no gap therebetween.

Further, according to the invention recited in claim 13, the joining flange section is joined to the reverse surface of the exterior member body by adhesive bonding. Thus, there is no need to form a section, such as a base or seat, for fixing a free end portion of the inner wall to the exterior member body, and no sink mark, i.e. surface cavity, would occur on the outer surface of the exterior member body due to a molding process. On the other hand, the superposition section is joined to the inner wall of the exterior member by a mechanical joint and thus can be fixed, more firmly than by adhesive bonding, to a portion where occurrence of a sink mark need not be cared about. In this way, the inner wall member can be fixed to the inner wall with an increased reliability.

Further, according to the invention recited in claim 14, the superposition section is located in the interior of the first closed section part and superposed on the inner wall. Thus, the inner wall member can be assembled to the exterior member in the following operational sequence. First, the inner wall member is mounted to the exterior member. Then, the inner wall is placed in abutment against the superposition section of the inner wall member, and then the bent section is bent as if guided by the superposition section. As a consequence, the inner wall can be placed in superposed contact with the superposition section. Thus, operation for bending the inner wall and joining the inner wall to the superposition section can be performed with an increased ease and an increased operability. Further, because the superposition section is located in the interior of the first closed section part, the inner wall member can be prevented from being accidentally detached from the exterior member.

Further, according to the invention recited in claim 15, the inner wall member is joined to the exterior member body via the separate-member joining mechanism, and the separate-member joining mechanism is located near the superposition section. Because the inner wall member can be joined to the exterior member body near the superposition section, it is possible to suppress deflection of the inner wall member. Thus, the inner wall member can be fixed to the inner wall with an increased reliability.

Further, according to the invention recited in claim 16, the inner wall member is joined to the exterior member body by being sandwiched between the reverse surface of the exterior member body and the locking surface of the separate-member joining mechanism. Thus, the inner wall member can be joined to the exterior member body with a projection amount, by which the inner wall member projects from the lower end of the exterior member body toward the door, appropriately minimized. Besides, it is possible to preclude influences of a "sink mark", or surface cavity, on the outer surface of the exterior member body due to the molding.

Further, according to the invention recited in claim 17, the locking claw can be disposed near the reverse surface of the exterior member body, and an amount of projection, from the exterior member body to the door, of the locking claw can be reduced. Further, because the locking claw accommodated in the engagement section of a recessed shape abuts against the inner wall member as the inner wall member moves in a longitudinal direction of the bent section (i.e., front-rear direction of the vehicle), it is possible to prevent the inner wall member from moving in the longitudinal direction (front-rear direction of the vehicle).

Further, according to the invention recited in claim 18, it is possible to prevent rain water from entering the interior of the first closed section part through one of openings of the first closed section part. In addition, it is possible to prevent reverberations, produced in the interior of the first closed section part, from leaking through one of openings of the first closed section part. Of course, if an end wall section is provided for covering the other opening, it is possible to prevent rain water from entering the interior of the first closed section part through the other opening of the first closed section part and prevent reverberations from leaking through the other opening of the first closed section part.

Further, according to the invention recited in claim 19, the provision of the evacuation section allows the body end joint section to be disposed closer to the lower end of the exterior member body (axis line of the bent section). As a consequence, the exterior member can be mounted with an increased strength.

Further, according to the invention recited in claim 20, the provision of the shield wall can prevent water and foreign substance from entering the interior of the first closed section part and prevent leakage of reverberations produced in the interior of the first closed section part.

Further, according to the invention recited in claim 21, the door body has the one drainage hole for discharging water having entered the interior of the door body. The exterior member is mounted on a lower section of the outer surface of the door body and has the extension section extending downward beyond the lower edge of the door body. The seal member is mounted on the extension section, and it contacts and seals the frame section of the get-in/out opening when the door is closed. The seal member includes the slant section located closer to the frame section than the drainage hole when the door is closed, and the slant section is opposed to the drainage hole and slants downward toward the extension section The flowing direction of drainage water discharged to the outside via the drainage hole is regulated by the slant section when the door is in the closed position. Namely, the slant section can regulate the drainage water flowing direction so that the drainage water does not flow toward the interior of the vehicle beyond the seal member. Besides, because the slant section slants downward toward the extension section, it can direct the drainage water away from the frame section of the get-in/out opening. The drainage water is directed by the slant section to flow to the drainage sealing section, from which it is discharged to a road surface. Thus, when the door is in the closed position, the present invention can prevent the drainage water from flowing beyond the seal member and accumulating and freezing between the seal member and the get-in/out opening. Because the seal member can be prevented from adhering to (freezing to) the frame section of the get-in/out opening due to freezing of the drainage water in the aforementioned manner, the present invention allows the seal member to have an increased durability.

Further, according to the invention recited in claim 22, the slant section, the drainage sealing section and the door body can together constitute a flow path of a trough shape. Thus, water discharged via the drainage hole can be directed by the slant section, the drainage sealing section and the door body so that it is discharged from a predetermined location. As a result, the present invention can minimize soilage of a lower section of the frame section (e.g., side sill) defining the get-in/out opening.

Further, according to the invention recited in claim 23, it is possible to prevent water, discharged via the drainage hole, from leaking from between the lower edge of the door body and the drainage sealing section. Further, because the exterior member does not directly hit the outer surface of the door body, generation of hitting sound can be avoided.

Further, according to the invention recited in claim 24, the reverse surface of the drainage sealing section is supported on the seal backup portion having a flat upper surface. Thus, the drainage sealing section can be retained in a flat posture. Thus, the present invention allows the drainage water, directed from the slant section, to be promptly discharged to the outside without accumulating in the drainage sealing section.

Further, according to the invention recited in claim 25, the seal member can be mounted to a substantially vertical wall section from inside or outside the vehicle, and thus, the operation for mounting the seal member can be facilitated. When the seal member has been pressed against the frame section defining the get-in/out opening, force input from the seal member can be received and dispersed by a surface of the wall section, so that undesired inclination and movement in the up-down direction of the seal member can be prevented.

Further, according to the invention recited in claim 26, the seal mounting section has an upper end formed integrally with the base portion of the drainage sealing section merging with the lower end of the slant section. Thus, when the seal member has been pressed against the frame section defining the get-in/out opening, reactive force produced in the seal member can be dispersed by the base portion having a great strength, so that deflection of the slant section can be suppressed.

Furthermore, according to the invention recited in claim 27, the provision of the hollow seal section can increase sealability between the seal member and the frame section defining the get-in/out opening. An inclination angle of the slanting surface of the slant section can be made close to the vertical angle as compared to that of a lip seal. Thus, even in case water accumulates in a corner between the drainage sealing section and the slant section, the water can be made hardly visible. In other words, the accumulated water can be made unnoticeable and invisible.

Furthermore, according to the invention recited in claim 28, the rib is formed on the corner between the seal backup portion and the joining flange section. The provision of such a rib can restrain deformation of the seal backup portion and the joining flange section. Particularly, the provision of the rib can prevent the joining flange section from falling down in the direction where the corner changes in angle. Further, using the rib, the outer-surface sealing section can be sandwiched between the rib and the outer door panel. As a result, the outer-surface sealing section can be retained reliably by the door.

BRIEF DESCRIPTION OF DRAWINGS

FIG. 19 is a sectional view taken along line 19-19 of FIG. 16.

DESCRIPTION OF EMBODIMENTS

Embodiment 1

Figure 1:
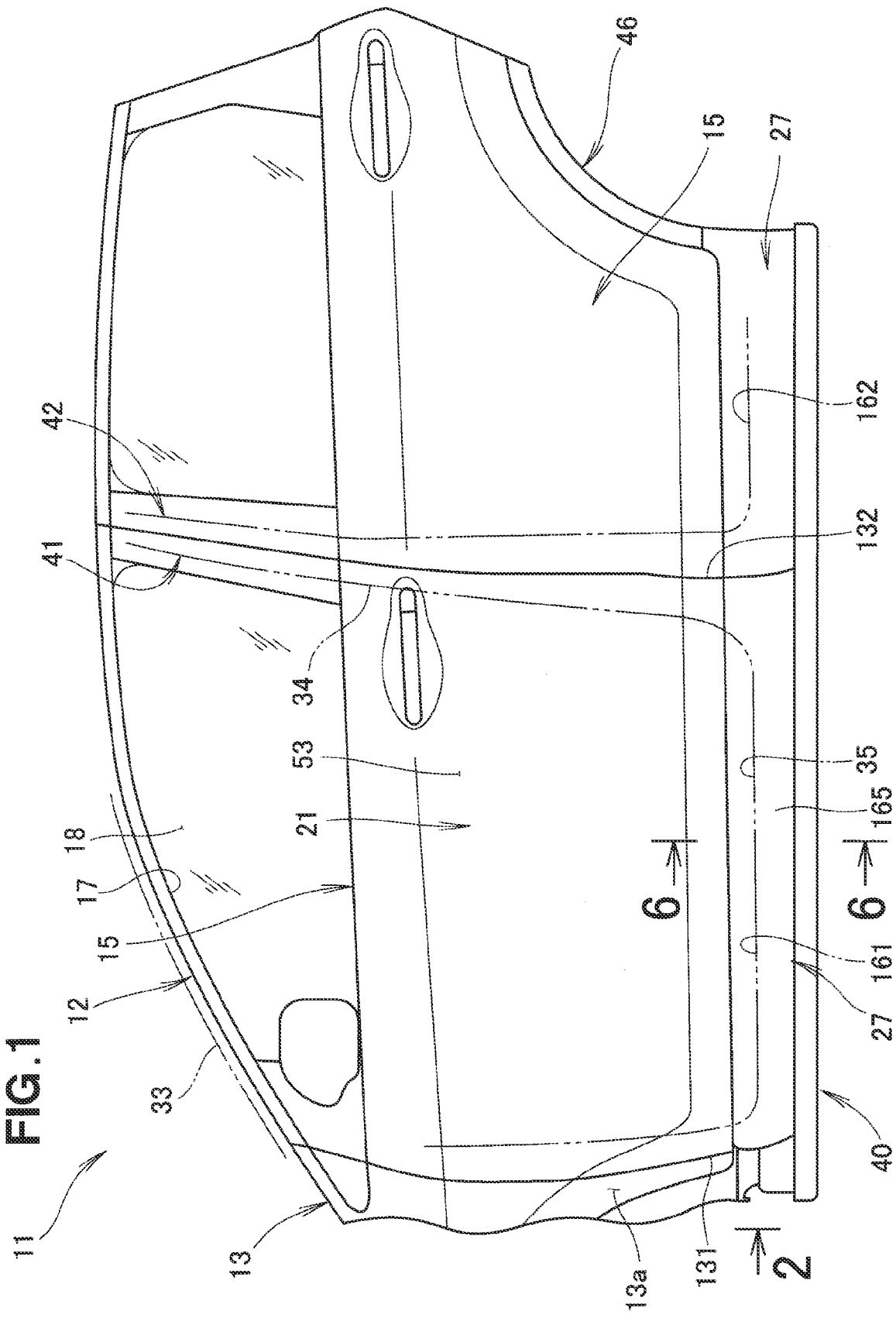
FIG. 1 is a side view showing principal sections of a vehicle provided with a first embodiment of a vehicle door assembly of the present invention.

A first embodiment of a vehicle door assembly of the present invention will be described with reference to FIGS. 1 to 24. As shown in FIG. 1, a vehicle 11 to which is applied the first embodiment of the vehicle door assembly of the present invention is a so-called four-door vehicle having left and right front doors 12 and left and right rear doors 46.

Left and right door openings 161 and left and right door openings 162 are formed in front and rear sections, respectively, of left and right side surfaces 13a of a vehicle body 13. The left and right door openings (get-in/out opening) 161 and left and right door openings (get-in/out opening) 162 are each for a passenger to get in and out of the vehicle 11. The left and right door openings 161 in the front section of the vehicle body 13 are opened and closed by the left and right front doors 12, while the rear left and right door openings 162 in the rear section of the vehicle body 13 are opened and closed by the left and right rear doors 46.

On the left and right side surfaces 13a of the vehicle body 13 are provided left and right frame sections 41 defining the left and right door openings 16 in the front section of the vehicle body 13 (get-in/out opening defining front frame sections 41) and left and right frame sections 42 defining the left and right door openings 162 in the rear section of the vehicle body 13 (get-in/out opening defining rear frame sections 42).

The left and right front doors 12 are openably/closably mounted on the left and right, front frame sections 41 via not-shown hinges. The left and right rear doors 46 are openably/closably mounted on the left and right rear frame sections 42 via not-shown hinges. The left and right front doors 12 and the left and right rear doors 46 are side doors that are oriented in a generally vertical direction when they are closing the corresponding door openings 161 and 162.

The left and right front frame sections 41 comprise left and right front pillars 33, left and right center pillars, and left and right side sills 35. The left and right rear frame sections 42 comprise left and right center pillars 34, left and right rear pillars (not shown), left and right roof rails (not shown), and the left and right side sills 35.

Hereinafter, the left and right front frame sections 41 will sometimes be referred to collectively as "front frame section 41", and the left and right rear frame sections 42 will sometimes be referred to collectively as "rear frame section 41".

The left and right front doors 12, the left and right rear doors 46, the left and right front frame sections 41 and the left and right rear frame sections 42 together constitute the "vehicle door assembly 40".

Figure 6:
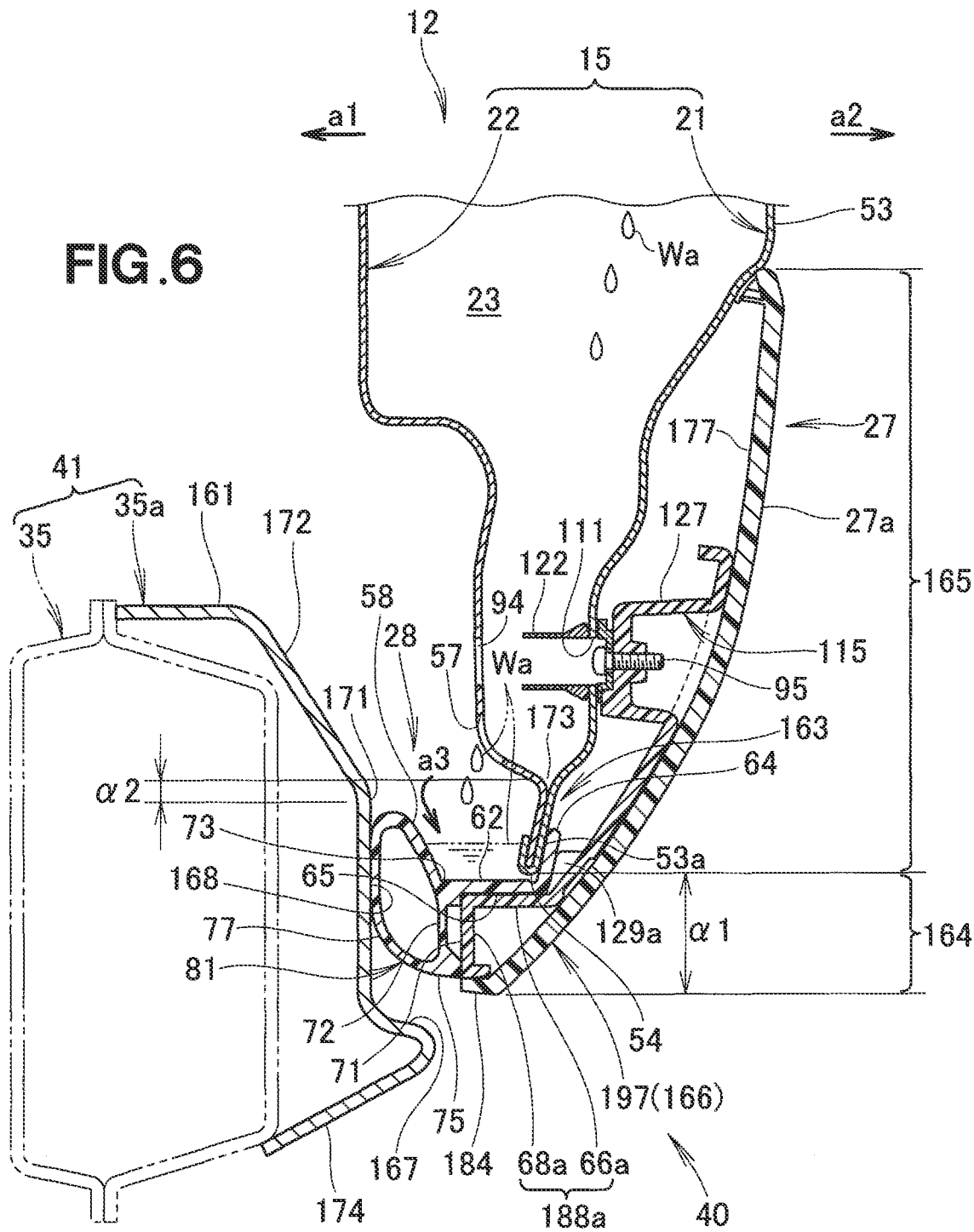
FIG. 6 is a sectional view taken along line 6-6 of FIG. 1.

As shown in FIGS. 1 and 6, at least outer surfaces, in the vehicle width direction, of the left and right side sills 35 is covered with left and right side sill garnishes 35a (side sill covers 35a). Thus, the left and right side sill garnishes 35a are substantially parts of the left and right side sills 35. The following description will be given assuming that the left and right side sill garnishes 35a are parts of the left and right side sills 35.

The following describe in detail the left front door (side door 12). The fright front door 12 will not be detailed here because it is of the same construction as the left front door 12 except that it is disposed in left-right symmetrical relation to the left front door 12. Also, the left and right rear doors 46 (side doors 46) will not be detailed here because they are of the same construction as the left front door 12 except that they are different in overall outline from the left front door 12.

The left front door 12 will hereinafter sometimes be referred to merely as "door 12". The door 12 includes a door body 15 openably and closably mounted on the front frame section 41, an exterior member 27 mounted on the door body 15, and a seal member 28 (see FIG. 6) mounted on the exterior member 27. The door body 15 includes an integral sash 17, and a glass 18 openably and closably guided along the sash 17.

The door body 15 is a hollow member which comprises an outer door panel 21 and an inner door panel 22. The outer door panel 21 and the inner door panel 22 may be formed of any desired material, such as a steel plate, aluminum plate or resin plate.

Figure 8:
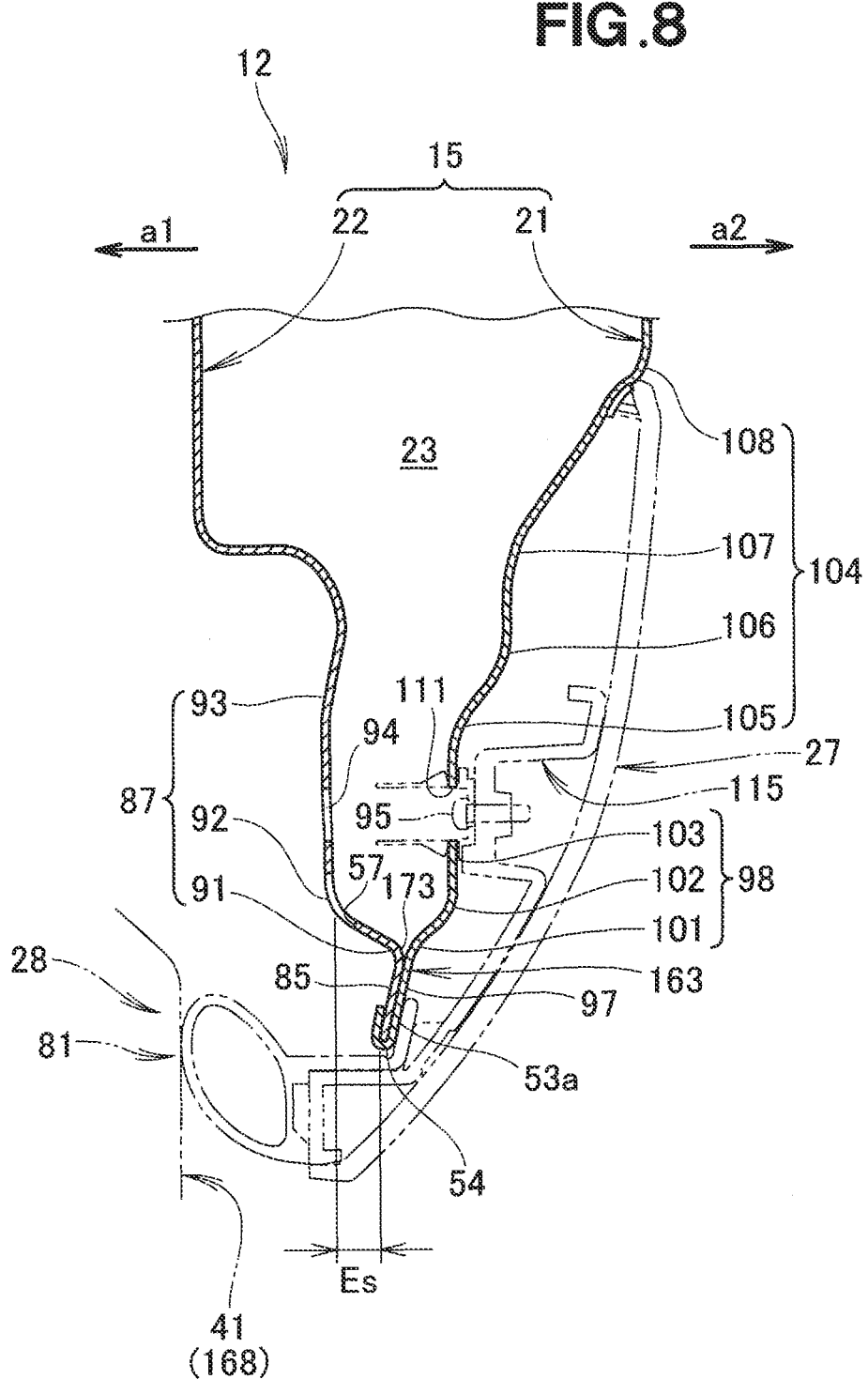
FIG. 8 is a sectional view taken along line 8-8 of FIG. 7.

Further, as shown in FIGS. 6 and 8, the respective edges of the outer door panel 21 and the inner door panel 22 are joined to each other to together constitute a peripheral edge section 163 of the door body 15. Namely, the edge (outer peripheral edge section or flange) of the outer door panel 21 and the edge (inner peripheral edge section or flange) of the inner door panel 22 are joined to each other. Thus, a hollow section 23 is defined in the door body 15 by the outer door panel 21 and the inner door panel 22.

Further, as shown in FIG. 8, a lower overlapping joint section (inner lower overlapping joint section) 85 and a bulging section (inner bulging section) 87 are formed integrally on a lower section of the inner door panel 22. The inner lower overlapping joint section 85 is a lower part of the peripheral edge section of the inner door panel 22.

The bulging section 87 is formed integrally or continuously with the upper end of the inner lower overlapping joint section 85 and bulges from the inner lower overlapping joint section 85 toward the interior of the vehicle 11 as indicated by arrow a1. The inner bulging section 87 includes a first bent portion 91, a second bent portion 92 and a curved portion (inner curved portion) 93. The inner curved portion 93 has a hole 94 formed through the thickness thereof and having a size to permit passage therethrough of a screw 95.

Figure 3:
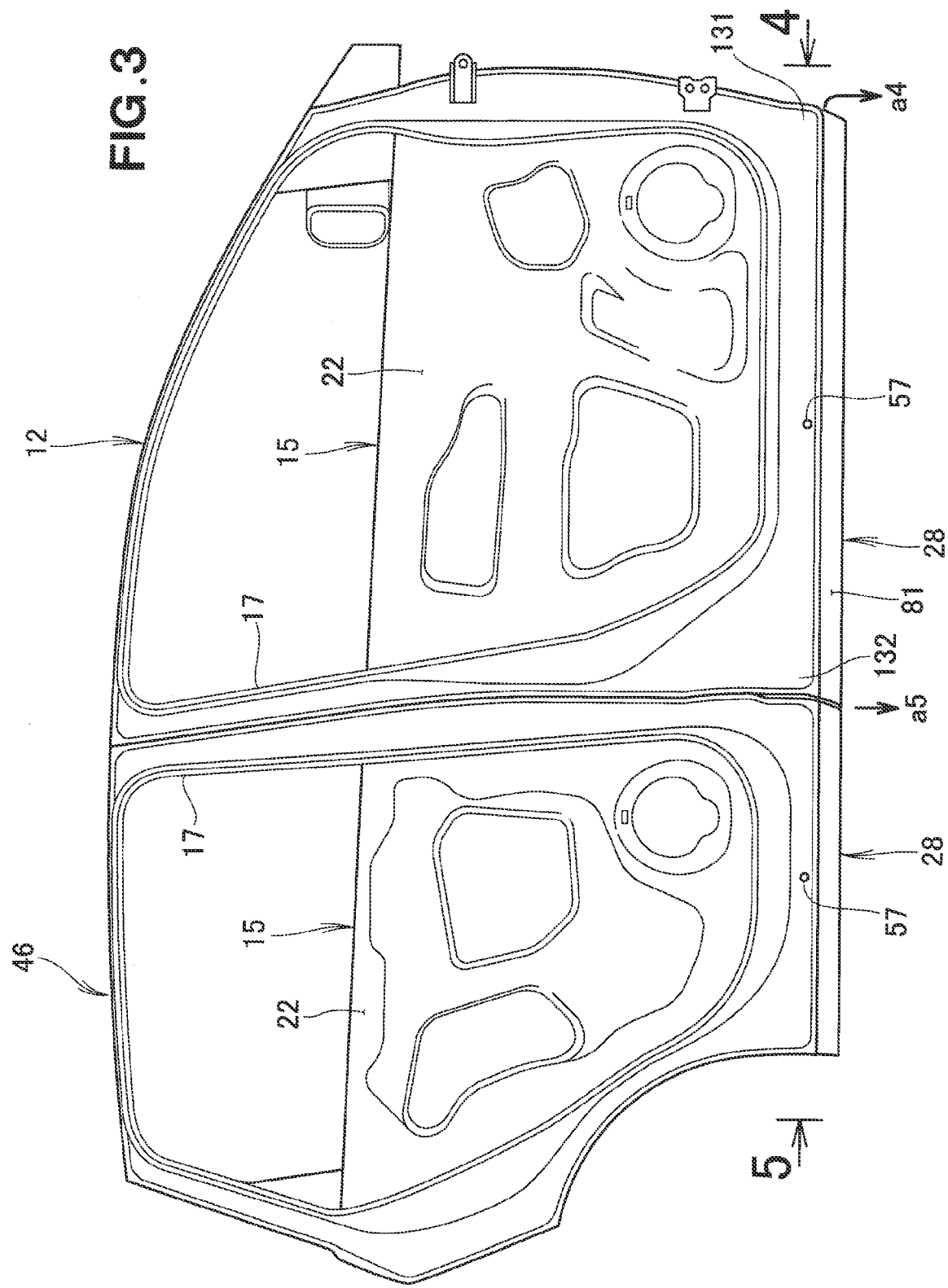
FIG. 3 is a view showing front and rear doors of FIG. 1 from inside the vehicle.

As shown in FIGS. 3 and 6, the inner door panel 22 has at least one drainage hole (preferably a plurality of drainage holes) 57 formed through the thickness thereof. The drainage hole 57 is a small through-hole for discharging water Wa, having entered the interior or hollow section 23 of the door body 15, to the outside. As shown in FIG. 8, when the door 12 is in a closed position, the drainage hole 57 is positioned spaced from the edge 54 (lower edge 54) of the door 15 toward the frame section 41 by a distance Es. The edge 54 is a lower end part of the peripheral edge section 163 of the door body 15.

Further, as shown in FIGS. 6 and 8, a lower overlapping joint section (outer lower overlapping joint section) 97 and first and second bulging sections (first and second outer bulging sections) 98 and 104 are formed integrally on a lower section of the outer door panel 21. The outer lower overlapping joint section 97 is a lower part of the peripheral edge section (flange) of the outer door panel 22.

The first outer bulging section 98 is formed integrally or continuously with the upper end of the outer lower overlapping joint section 97 and bulges from the outer lower overlapping joint section 97 toward the exterior in the vehicle width direction as indicated by arrow a2. The first outer bulging section 98 includes a first bent portion 101, a second bent portion 102 and a first curved portion (first outer curve portion) 103. The first outer curve portion 103 has a clipping hole 111 formed therein (see FIG. 7).

Figure 7:
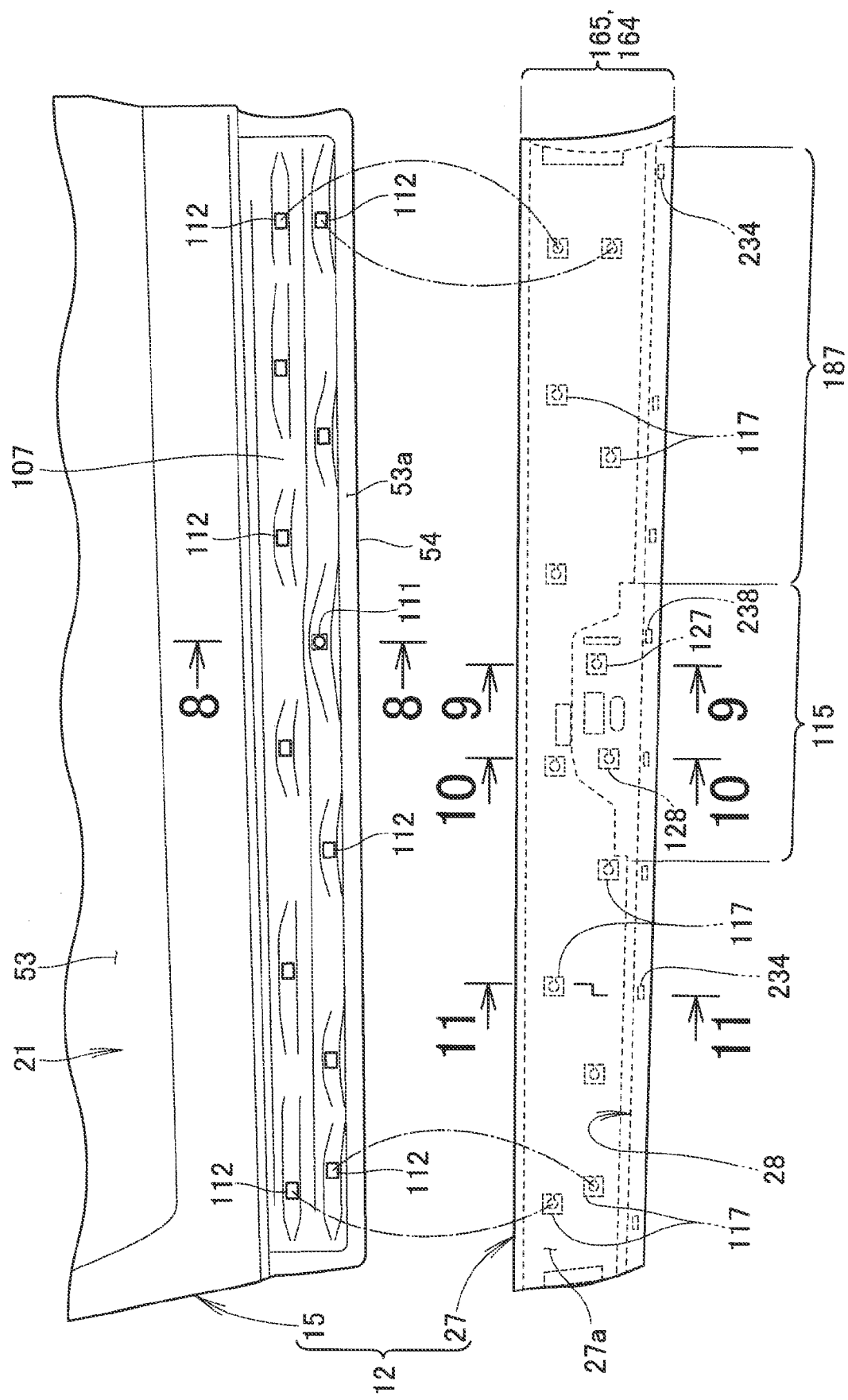
FIG. 7 is an exploded side view of a lower section of a front door and an exterior member shown in FIG. 1.
Figure 11:
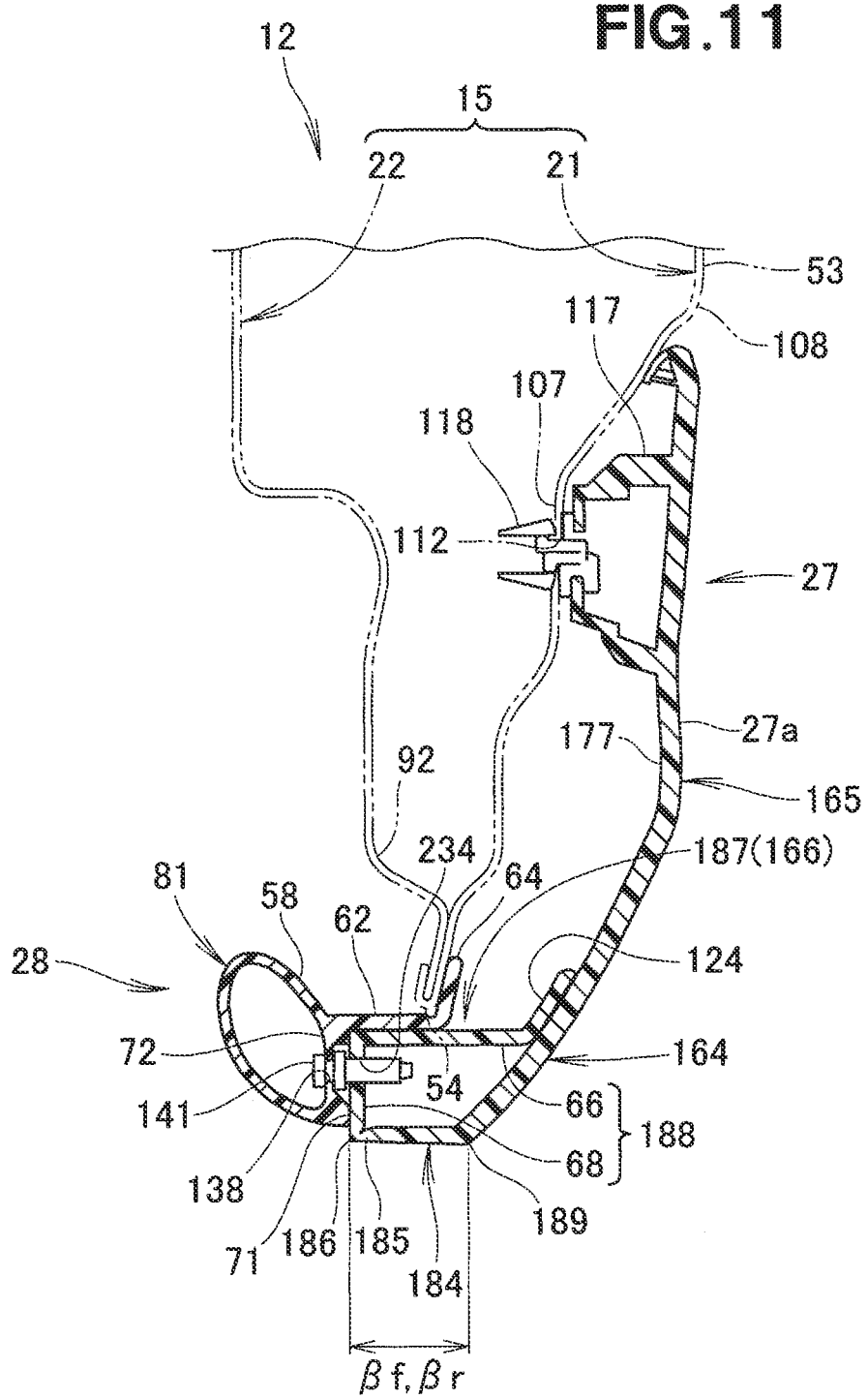
FIG. 11 is a sectional view taken along line 11-11 of FIG. 7.
Figure 12:
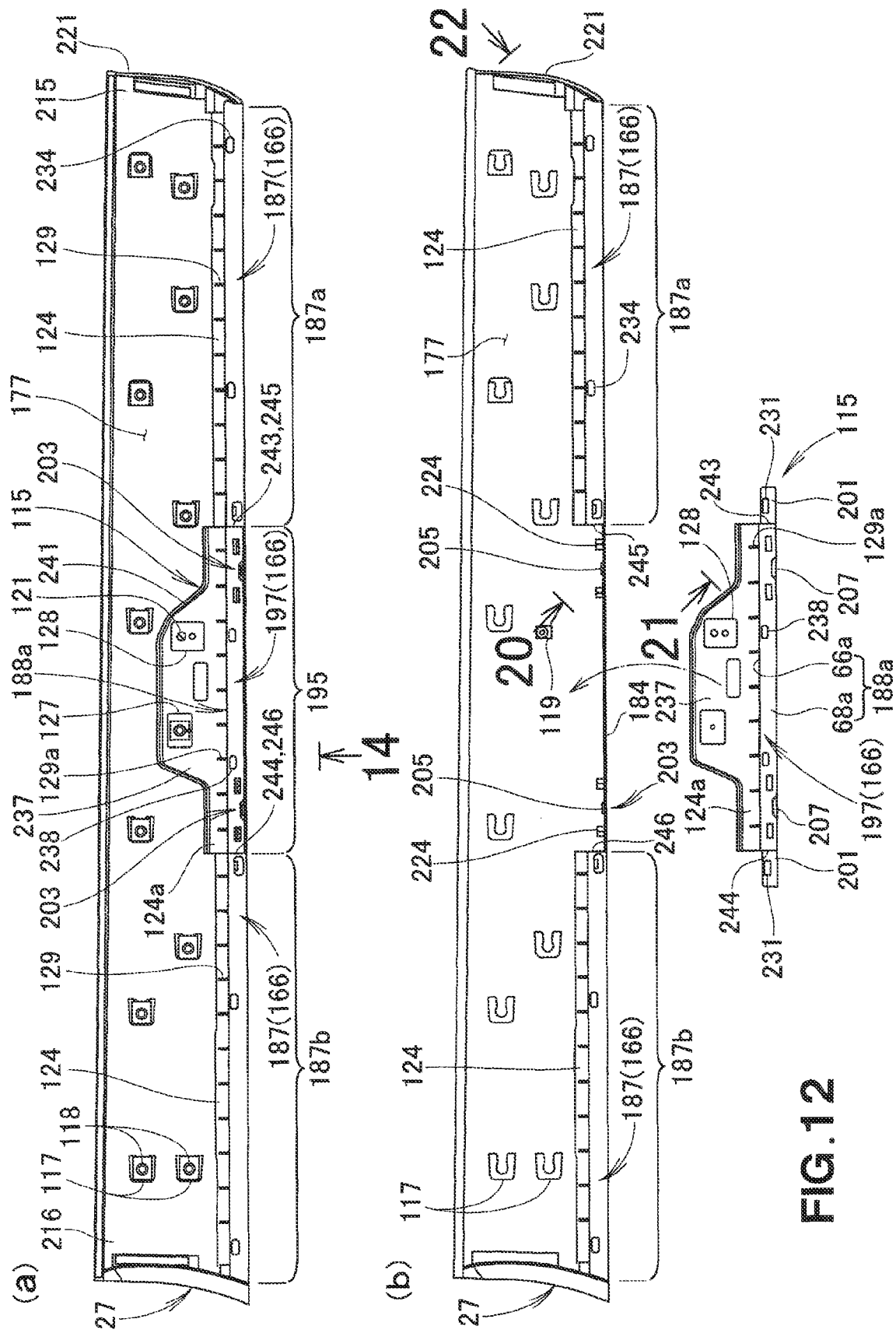
FIG. 12 is a view showing the exterior member of FIG. 7 from a reverse side thereof, which is particularly explanatory of an assembled state and an exploded state of an inner wall member.

The second outer bulging section 104 is formed integrally or continuously with the upper end of the first outer bulging section 98 and bulges from the first outer bulging section 98 toward the exterior in the vehicle width direction as indicated by arrow a2. The second outer bulging section 104 includes a third bent portion 105, a fourth bent portion 106, a fifth bent portion 107 and a sixth bent portion 108. As shown in FIGS. 7 and 11, the fifth bent portion 107 has a plurality of clipping holes 112 formed therein at substantially equal intervals As shown in FIG. 6, the frame section 41 has a door-facing surface 167 and a sealing surface 168. The door-facing surface 167 and the sealing surface 168 are formed, for example, on the outer surface, in the vehicle width direction, of the side sill garnish 35a. The door-facing surface 167 is a surface that is located generally on an extension of the edge 54 (lower edge 54) of the door body 15 and that diagonally faces the edge 54 of the door body 15 when the door 12 is in a closed position.

The sealing surface 168 is a surface extending from the door-facing surface 167 toward the door opening 161. The sealing surface 168 is disposed in such a manner that the seal member 28 contacts the sealing surface 168 when the door 12 is closed in a direction perpendicular to the door opening 161 (i.e., closed in a direction of arrow a1).

At least a part of the inner peripheral surface of the frame section 41 comprises a slanting wall section 172 inclined from an end 171 of the sealing surface 168 closer to the door opening 161 toward the center of the door opening 161 and toward the interior of the vehicle.

When the door 12 is closed, the end 171 of the sealing surface 168 is located closer to the door-facing surface 173 by a height $\alpha 2$ than a start point 173 where the edge 97 of the outer door panel 21 and the edge 85 of the inner door panel 22 start being superposed on each other. Namely, the end 171 of the sealing surface 168 is located lower than the start point 173 by the height $\alpha 2$.

At least a part of the outer peripheral surface of the frame section 41 comprises a design wall section 174 formed continuously with the door-facing surface 167. The design wall section 174 of the frame section 41 serves to enhance the outer appearance of the frame section 41, and the outer surface of the design wall section 174 is shaped such that it lies substantially flush with the outer surface 27a of the exterior member 27.

The following described in detail the exterior member 27. The exterior member 27, which is also called "lower door garnish", is a member for enhancing design quality of the vehicle 11 and/or protecting the outer surface 53 of the vehicle body 15. The exterior member 27 is formed of a material, such as a resin material, softer than the door body 15, i.e. greater in tensile strength than the door body 15.

Further, as shown in FIG. 6, the exterior member 27 is superposed and mounted on the outer surface 53 of the door member 15 of the door body 15, i.e. a lower section of the outer surface 53 of the outer door panel and thereby covers at least a part of the external surface 53.

More specifically, as shown in FIG. 8, the first outer bulging section 98 and second outer bulging section 104 of the outer door panel 21 are covered with the exterior member 27. The outer surface 27a of the exterior member 27 lies almost continuously with the outer surface 53 of the door 12, i.e. with no substantive gap left between the outer surface 27a and the outer surface 53.

Further, as shown in FIGS. 7, 11, FIG. 12(a) and FIG. 12(b), the exterior member 27 is an integrally molded component part comprising an exterior member body 165 (including an extension section 164), a flange section 184, a bent section 186, an inner wall 188 and a joining flange section 124.

As shown in FIG. 6, the exterior member body 165 covers at least a section, e.g. lower section, of the external surface 53 of the outer door panel 21.

Further, the extension section 164, which is a section integrally formed to supplement the exterior member body 165, extends an extension distance $\alpha 1$ from the exterior member body 165, along the outer surface 53, outwardly beyond the edge 54 of the door body 15. For example, the extension section 164 extends from the exterior member body 165 to near the outer edge of the frame section 41 (i.e., to near the design wall section 174 of the frame section 41).

The outer surface of the exterior member body 165 and the outer surface of the extension section 164 are substantially identical to the outer surface 27a of the exterior member 27. Further, the reverse surface of the exterior member body 165 and the reverse surface of the extension section 164 are substantially identical to the reverse surface 177 of the exterior member 27. Thus, in the following description, the outer surface of the exterior member body 165 and the outer surface of the extension section 164 will be mentioned with reference character 27a while the reverse surface of the exterior member body 165 and the reverse surface of the extension section 164 will be mentioned with reference character 177, as necessary.

Because the outer surface 27a of the exterior member 27 and hence the outer surfaces 27a of the exterior member body 165 and the extension section 164 are surfaces influencing the design quality of the vehicle body 11, these surfaces 27a will be collectively referred to as "design surface 27a" as necessary. Because the exterior member body 165 and the extension section 164 have the design surface 27a, they will sometimes be referred to also as "design sections 165 and 164".

The exterior member body 165 and the extension section 164 are curved to extend to beneath the lower edge 54 along a lower portion of the outer surface 27a of the exterior member 27.

As shown in FIG. 11, the flange section 184 extends substantially horizontally from an edge 189 of the exterior member body 165 (edge 189 of the extension section 164) toward the peripheral edge section 163 of the door body 15 (see FIG. 6), i.e. toward the interior of the vehicle. The flange section 184 has an outer surface that does not substantially influence the design quality of the vehicle 11 (see FIG. 1). Because the flange section 184 is a section substantially invisible when the vehicle 11 is viewed sideways, it will be referred to also as "non-design section 184" as necessary. Further, because the edge 189 of the extension section 164 is a boundary between the extension section 164 and the flange section 184, it will be referred to also as "boundary corner portion 189".

Further, the bent section 186 is a reduced-thickness section formed integrally with the distal end 185 of the flange section 184 and bendable in a thickness direction of the flange section 184. Namely, the bent section 186 is a section that has a smaller thickness than the flange section 184 and the inner wall 188 and is bendable easily like a hinge. Therefore, the bent section 186 will be referred to also as "reduced-thickness hinge 186" as necessary. The bent section 186 extends straight along the distal end 185 of the flange section 184.

The inner wall 188 is a section formed integrally with the bent section 186 and bendable about the bent section 186 toward the reverse surface 177 of the exterior member body 165 (extension section 164). The inner wall 188 extends straight from a front end portion 131 to a rear end portion 132 of the door body 15 shown in FIG. 3. More specifically, the inner wall 188 includes a wall section 68 formed continuously with the bent section 186, and a lower plate portion 66 formed continuous with the distal end of the wall section 68.

The lower plate portion 66 (seal backup portion 66), which is of a substantially horizontal plate shape, is located under the lower edge 54 of the door body 15 and has a flat upper surface. Here, "substantially horizontal" means a state where the lower plate portion 66 lies substantially horizontal when the vehicle 11 is in a horizontal position.

The wall section 68 is a section of a substantially vertical plate shape extending downward from an end, remote from the door body 15, of the lower plate portion 66. A surface 71 of the wall section 68 opposite from the reverse surface 177 of the exterior member 27 (i.e., end surface or outer surface 71 of the wall section 68) is provided as a "seal mounting surface 71".

Figure 13:
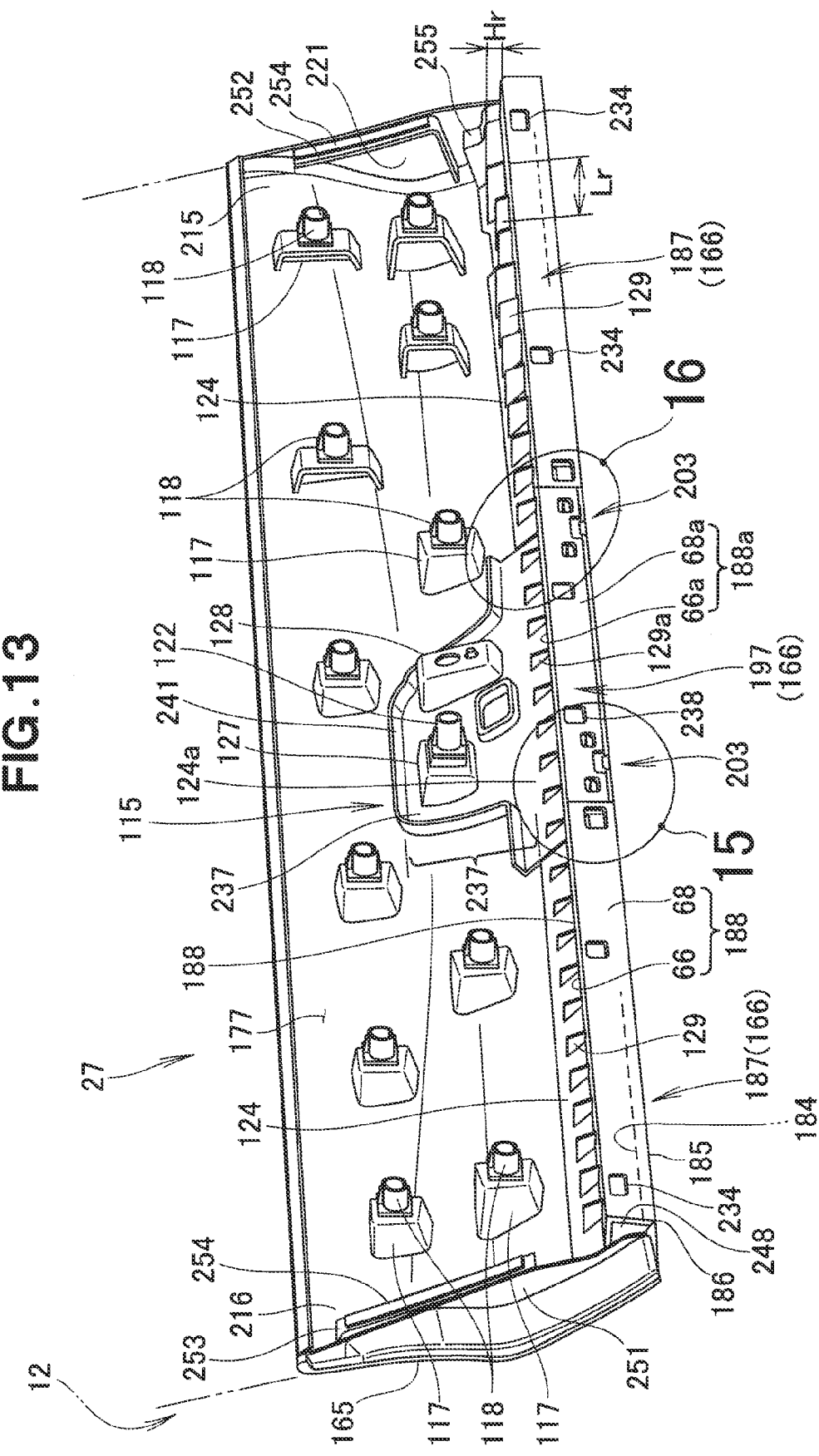
FIG. 13 is a perspective view of the exterior member and the inner wall member in the assembled state.
Figure 17:
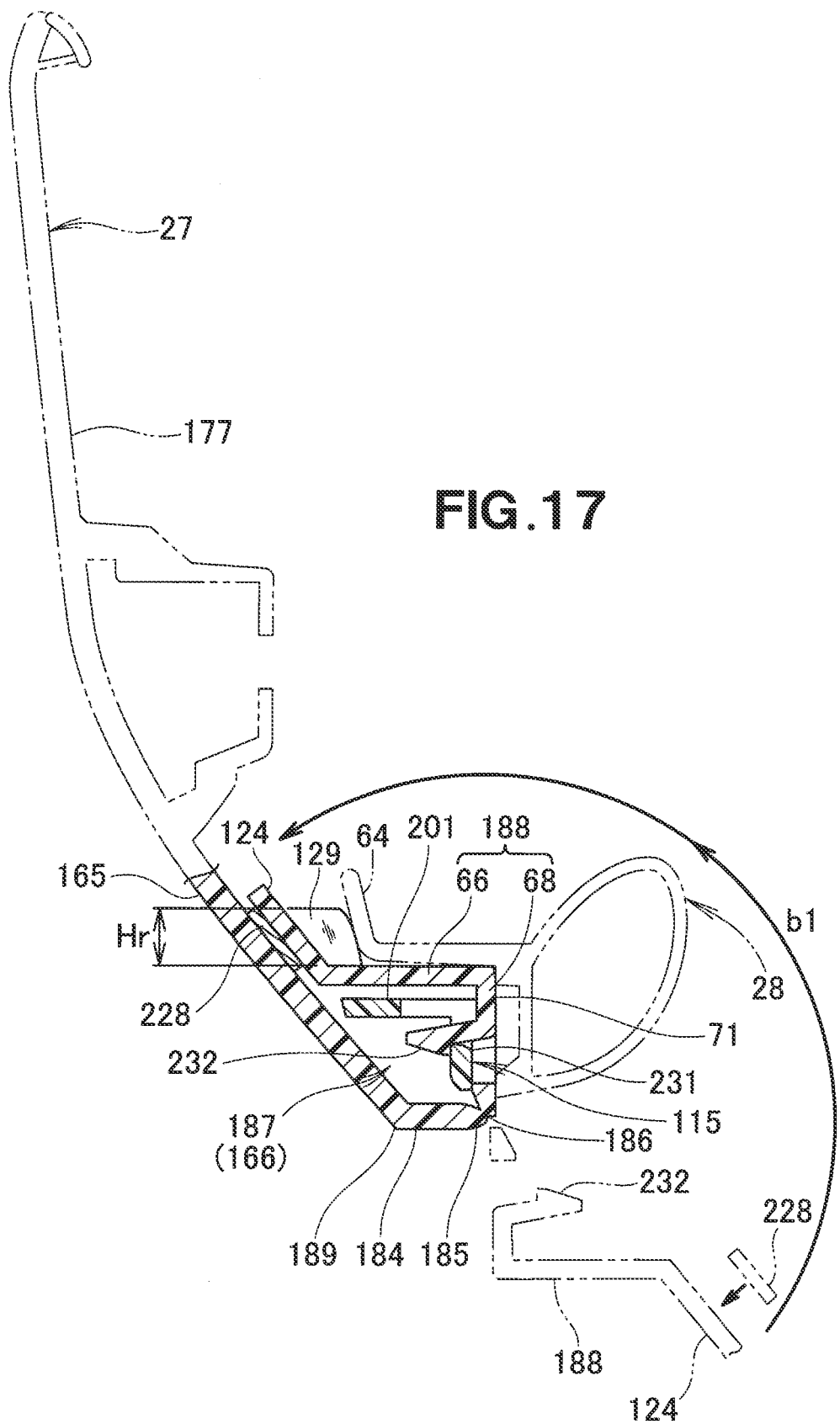
FIG. 17 is a sectional view taken along line 17-17 of FIG. 16.

The joining flange section 124 is a free end section formed at a distal end portion of the inner wall 188 and capable of being joined to the reverse surface 177 of the exterior member body 165. Namely, the joining flange section 124 extends upward from an end, adjacent to the reverse surface of the exterior member 27, of the seal backup portion 66. Further, as shown in FIGS. 13 and 17, the exterior member 27 has at least one rib 129 (preferably a plurality of ribs 129 arranged in a horizontal row) formed on a corner between the lower plate portion 66 and the joining flange section 124.

The bent section 186 is bent in such a manner that the joining flange section 124 is superposed on and joined to the reverse surface 177 of the exterior member body 165. With the joining flange section 124 joined to the reverse surface 177 of the exterior member body 165 like this, the exterior member body 165, the flange section 184 and the inner wall 188 together constitute a first closed section part 187 of a closed sectional shape. The joining flange section 124 is joined to the reverse surface 177 of the exterior member body 165 by adhesive bonding.

Figure 9:
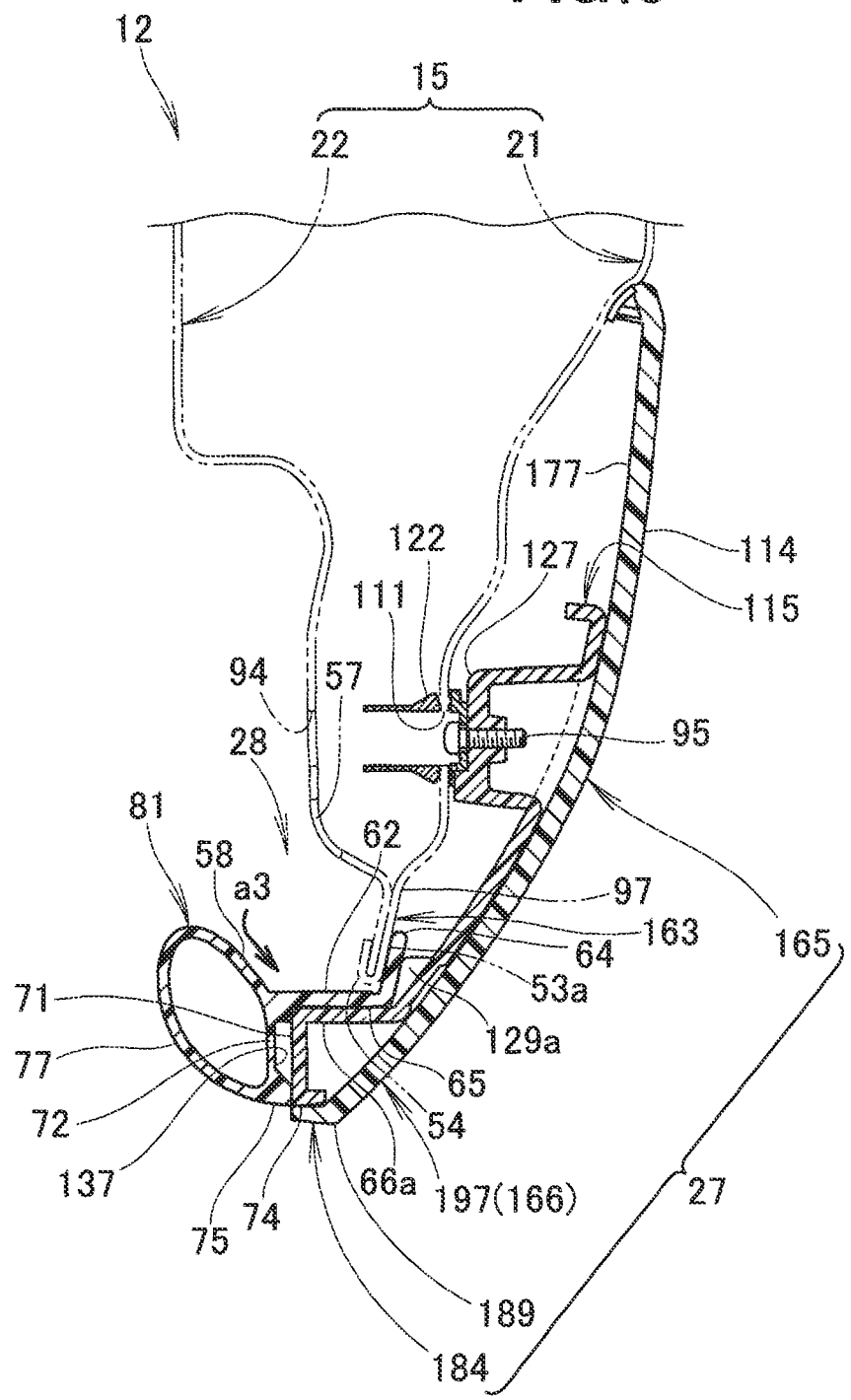
FIG. 9 is a sectional view taken along line 9-9 of FIG. 7.

The first closed section part 187 is formed on the reverse surface 177 of the exterior member body 165 in a closed sectional shape and disposed be positioned between the edge 54 of the door body 15 and the door-facing surface 167 when the door 12 is closed. As apparent from the foregoing description, the first closed section part 187 includes the lower plate portion 66, the joining flange section 124 and the at least one rib 129. As shown in FIG. 9, the first closed section part 187 has the end surface 71 extending adjacent to an opposite side of the edge 54 of the door body 15 from the reverse surface 177 of the extension section 164, and the end surface 71 comprises the outer surface 71 of the wall section 68.

The exterior member 27 is mounted on the door body 15 in the following manner. As shown in FIGS. 7, 11 and 13, the outer door panel 21 has a plurality of clipping holes 112 formed through the thickness thereof. A plurality of lugs (fixing portions) 117 projecting toward the clipping holes 112 are formed on the reverse surface 177 of the exterior member body 165. The plurality of lugs 117 are superposed on the outer door panel 21 and fastened to the clipping holes 112 by means of clops 118, so that the exterior member 27 is mounted on the door body 15.

Further, as shown in FIGS. 13 and 22 to 24, the exterior member 27 includes end wall sections 221 and 251, body end joint sections 252 and 253, an evacuation section 255 and a shield wall 257.

One of the end wall sections 221 extends from one end 215, in the extending direction of the straight bent section 186, of the exterior member body 165 toward the door body 15 (see FIG. 6). At least a part (e.g., several dozen percent) of an opening 218 of the first closed section part 187 located near the one end 215 of the exterior member body 165 is covered with the one end wall section 221.

Further, as shown in FIG. 13, the other end wall sections 251 extends from the other end 216, in the extending direction of the straight bent section 186, of the exterior member body 165 toward the door body 15 (see FIG. 6). At least a part (e.g., several dozen percent) of an opening 248 of the first closed section part 187 located near the other end 216 of the exterior member body 165 is covered with the other end wall section 251.

The body end joint sections 252 and 253 are provided to join the exterior member body 165 to the door body 15. The body end joint sections 252 and 253 are joined to the outer surface 53 of the outer door panel 21, for example, by means of adhesive tapes 254. The adhesive tapes 254 are, for example, double-sided tapes each of which comprises a thin film-like base sheet having adhesive layers formed on both surfaces thereof.

At a position where the evacuation section 255 would interfere with the body end joint sections 252 and 253 when the joining flange section 124 is joined to the exterior member body 165, the evacuation section 255 is formed in such a manner as to bypass the body end joint sections 252 and 253. Namely, the evacuation section 255 is located to prevent the inner wall 188 from interfering with the body end joint sections 252 and 253 as the inner wall 188 is bent about the bent section 186 as noted above.

The shield wall 257 is provided to close up a gap between the reverse surface 177 of the exterior member body 165 and the evacuation section 255.

Figure 14:
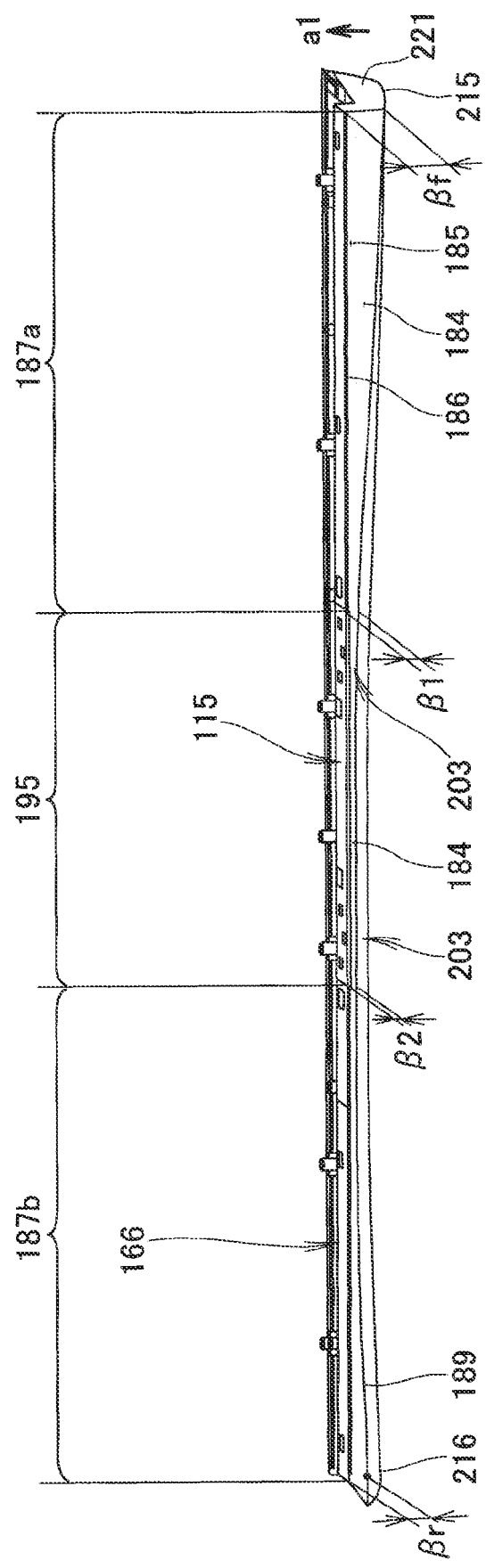
FIG. 14 is a view taken in the direction of arrow 14 of FIG. 12.
Figure 15:
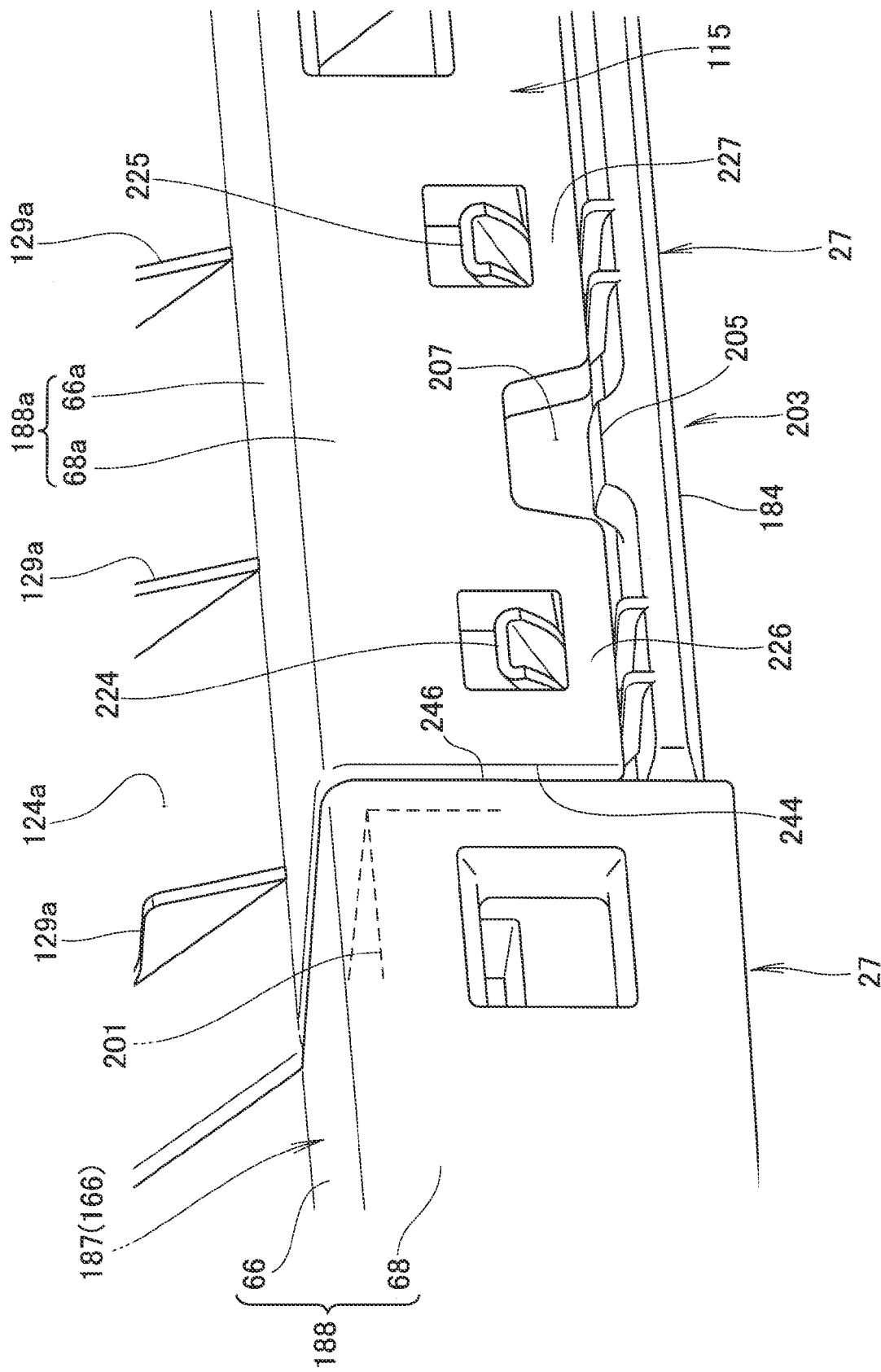
FIG. 15 is a view showing in enlarged scale a section encircled at 15 in FIG. 13.

Further, as shown in FIGS. 11 and 14, the exterior member 27 is curved to be slightly concaved or recessed in the vehicle width direction. Thus, a spaced-apart distance βf, βr from the edge 189 to the bent section 186 of the exterior member body 165 differs among portions of the exterior member body 165. Namely, the spaced-apart distance βf, βr gradually decreases in a direction from the opposite ends 215 and 216, in the front-rear direction of the vehicle, toward the middle in the front-rear direction.

As shown in FIGS. 12(a), 12(b) and 14, the bent section 186 and the inner wall 188 are provided only in portions 187a and 187b of the exterior member body 165 where the spaced-apart distance βf, βr is greater than a predetermined distance β1, β2. An inner wall member 115 that is a separate member from the inner wall 188 is mounted on the reverse surface 177 of the remaining portion 195 where the bent section 186 and the inner wall 188 are not provided.

FIG. 12(a) shows, from the side of the reverse surface 177, the inner wall member 115 mounted on the exterior member 27, and FIG. 12(b) shows, from the side of the reverse surface 177, the inner wall member 115 dismounted or detached from the inner wall member 115.

The inner wall member 115 is a component part integrally molded of resin, which includes an inner wall 188a, a joining flange section 124a, a plurality of seal pressing sections 129a, an inner-wall-door joint section 237 and a rib 241.

The inner wall 188a of the inner wall member 115, which is substantially the same in construction as the inner wall 188 of the exterior member 27, includes a seal backup portion 66a and a wall section 68a. The seal backup portion 66a is substantially the same in construction as the seal backup portion 66 of the exterior member 27, and the wall section 68a is substantially the same in construction as the wall section 68 of the exterior member 27. Further, the joining flange section 124a is substantially the same in construction as the joining flange section 124 of the exterior member 27. The plurality of seal pressing sections 129a (ribs 129a) are substantially the same in construction as the plurality of seal pressing sections 129 of the exterior member 27.

Figure 18:
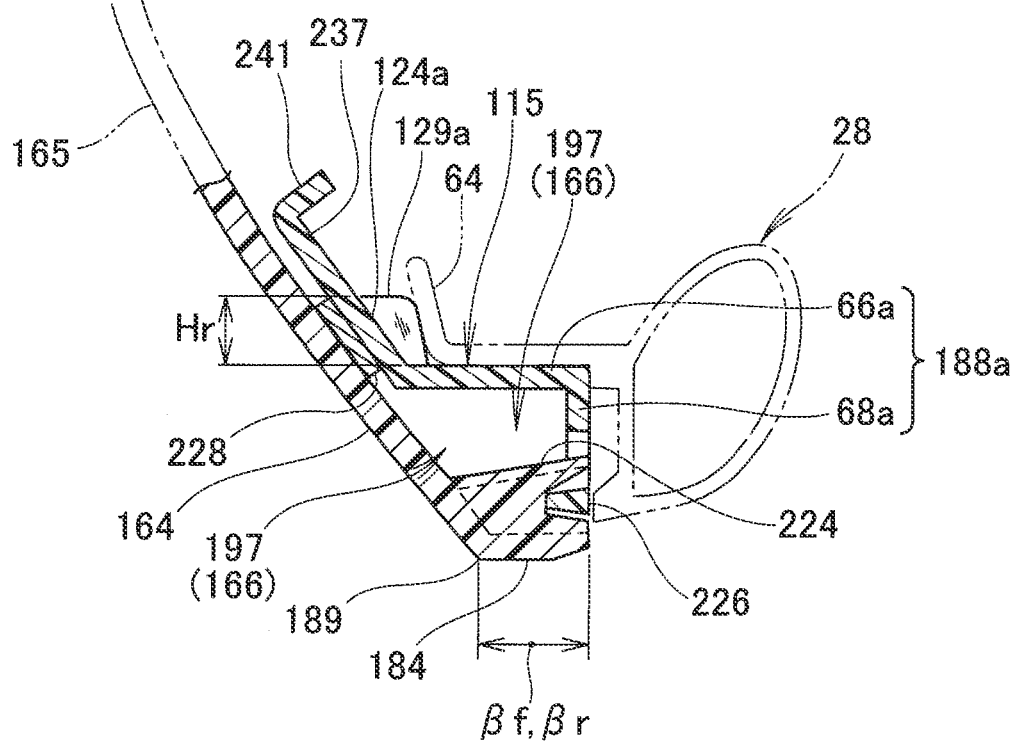
FIG. 18 is a sectional view taken along line 18-18 of FIG. 16.

As shown in FIGS. 13 and 14, respective lengths Lr of the plurality of seal pressing sections 129a are set to gradually decrease as the spaced-apart distance βf, βr from the edge 189 of the exterior member body 165 to the bent section 186 gradually decreases in a direction from the opposite ends 215 and 216 in the front-rear direction of the vehicle toward the middle in the front-rear direction. Further, as shown in FIGS. 17 and 18, a height Hr of the seal pressing sections 129 and 129a is set lower than a height of an outer-surface sealing section 64; for example, the height Hr is set at about 60% of the height of the outer-surface sealing section 64. Thus, the instant embodiment allows the seal pressing sections 129 and 129a to press against and hold the outer-surface sealing section 64 while achieving reduced weights of the exterior member 27 and inner wall member 115.

The inner wall member 115 and the exterior member body 165 together constitute a second closed section part 197 of a closed sectional shape. The first closed section part 187 and the second closed section part 197 extend in a series along the bent section 186. More specifically, the first closed section part 187 and the second closed section part 197 extend in a series in the front-rear direction of the vehicle body. The second closed section part 197 is substantially the same in closed sectional shape and size as the first closed section part 187. A combination of the first closed section part 187 and the second closed section part 197 constitutes a "closed section part 166".

As shown in FIGS. 12(a), 12(b) and 13, the inner-wall-door joint section 237 is a section that extends upward from the upper end of the joining flange section 124a and is superposed on and joined to the reverse surface 177 of the exterior member body 165.

The rib 241 is formed to edge the outer periphery of the inner-wall-door joint section 237. When an impact load has acted from a lateral side of the vehicle 11 on the door 12, e.g. when a lateral collision has occurred, the impact load is dispersed by the rib 241 throughout the exterior member 27. Thus, the instant embodiment can increase the strength of the exterior member 27 and inner wall member 115.

The lower end of the inner wall member 115 is mounted on the exterior member 27 in the following manner. As shown in FIGS. 13 and 16 to 19, the exterior member 27 includes two separate-member joining mechanisms 203 that join the inner wall member 115 to the exterior member body 165 (including the extension section 164) and that are located near the superposition sections 201.

Each of the separate-member joining mechanisms 203 includes the superposition section 201, a locking claw 205, a locking surface 206, an engagement section 207, first and second U-shaped restriction sections 224 and 225, first and second abutment restriction sections 226 and 227, a locking section 231 and an engaging claw section 232.

The locking claw 205 projects from the flange section 184 toward the inner wall member 115. The locking surface 206 is one surface of the locking claw 205 and faces the reverse surface 177 of the exterior member body 165. The engagement section 207 is formed on the inner wall member 115 for locking engagement by the locking surface 206. More specifically, the engagement section 207 is formed in a shape recessed from a surface of the inner wall member 115 abutting against the locking surface 206 toward the reverse surface 177 of the exterior member body 165. The inner wall member 115 is joined to the exterior member body 165 by being sandwiched between the reverse surface 177 of the exterior member body 165 and the locking surface 206. Note that, instead of being limited to the recessed shape, the engagement section 207 may be of a mere flat shape or may be in the form of a projection engageable by the locking claw 205.

Figure 16:
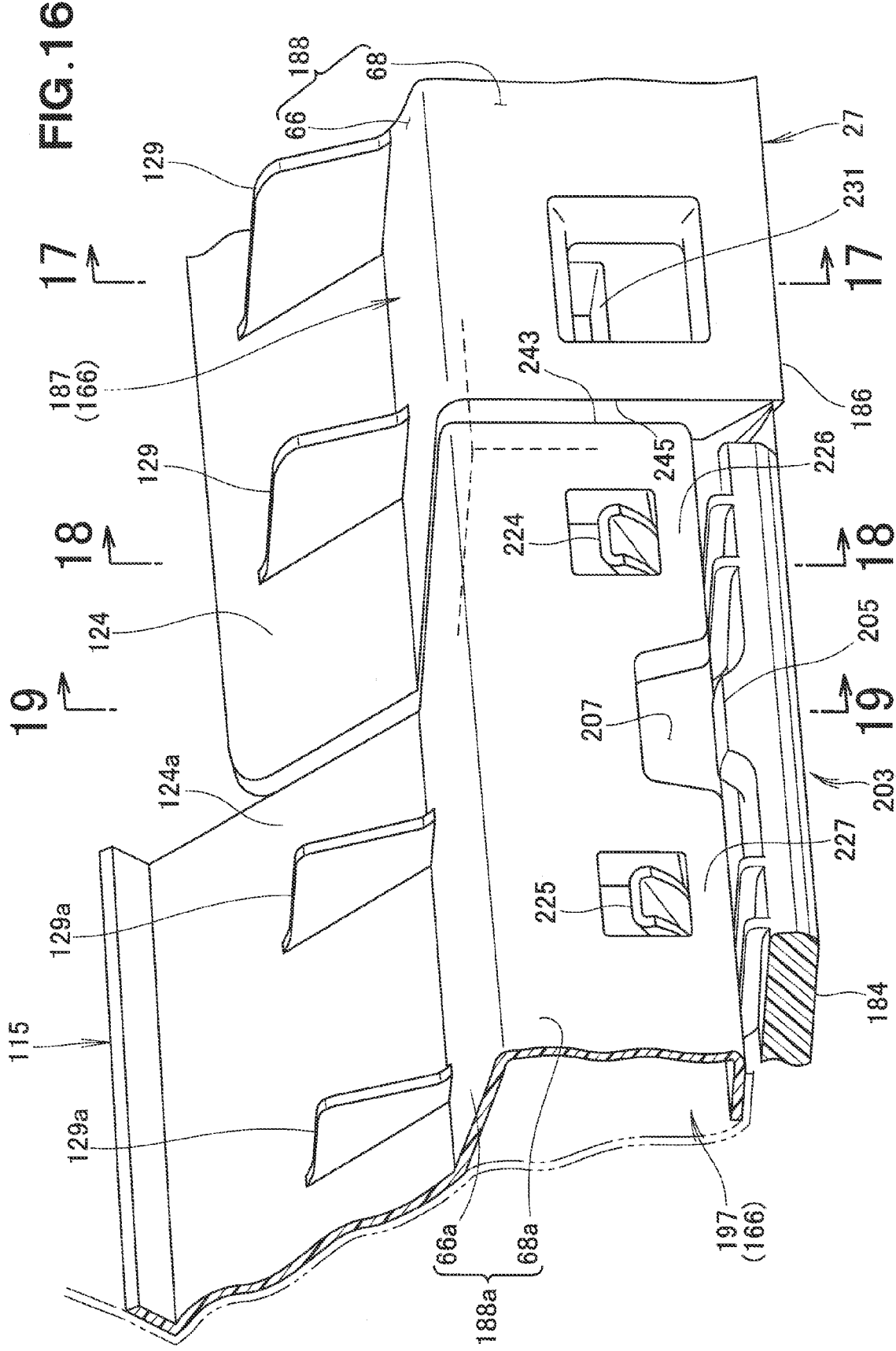
FIG. 16 is a view showing in enlarged scale a section encircled at 16 in FIG. 13.
Figure 20:
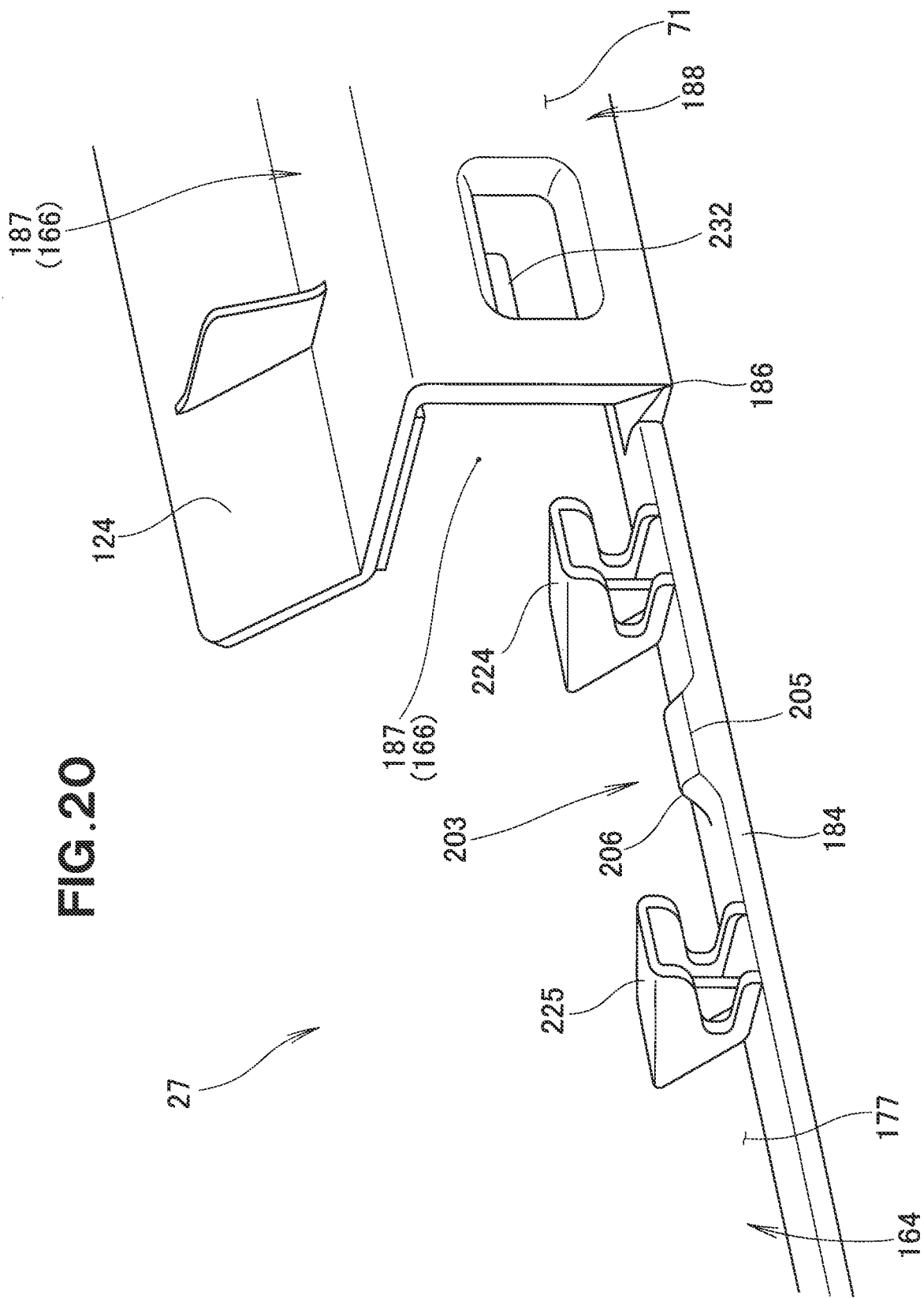
FIG. 20 is a perspective view taken in the direction of arrow 20 of FIG. 12.

Further, as shown in FIGS. 16, 18 and 20, the first and second U-shaped restriction sections 224 and 225 each project inwardly in the vehicle width direction from the reverse surface 177 of the extension section 164 and have a substantially U-shaped horizontal groove opening to the distal end thereof. The first and second abutment restriction sections 226 and 227 are each formed in a horizontal bar shape on the wall section 68a of the inner wall member 115 and are fitted in the horizontal grooves of the first and second U-shaped restriction sections 224 and 225, respectively.

Figure 21:
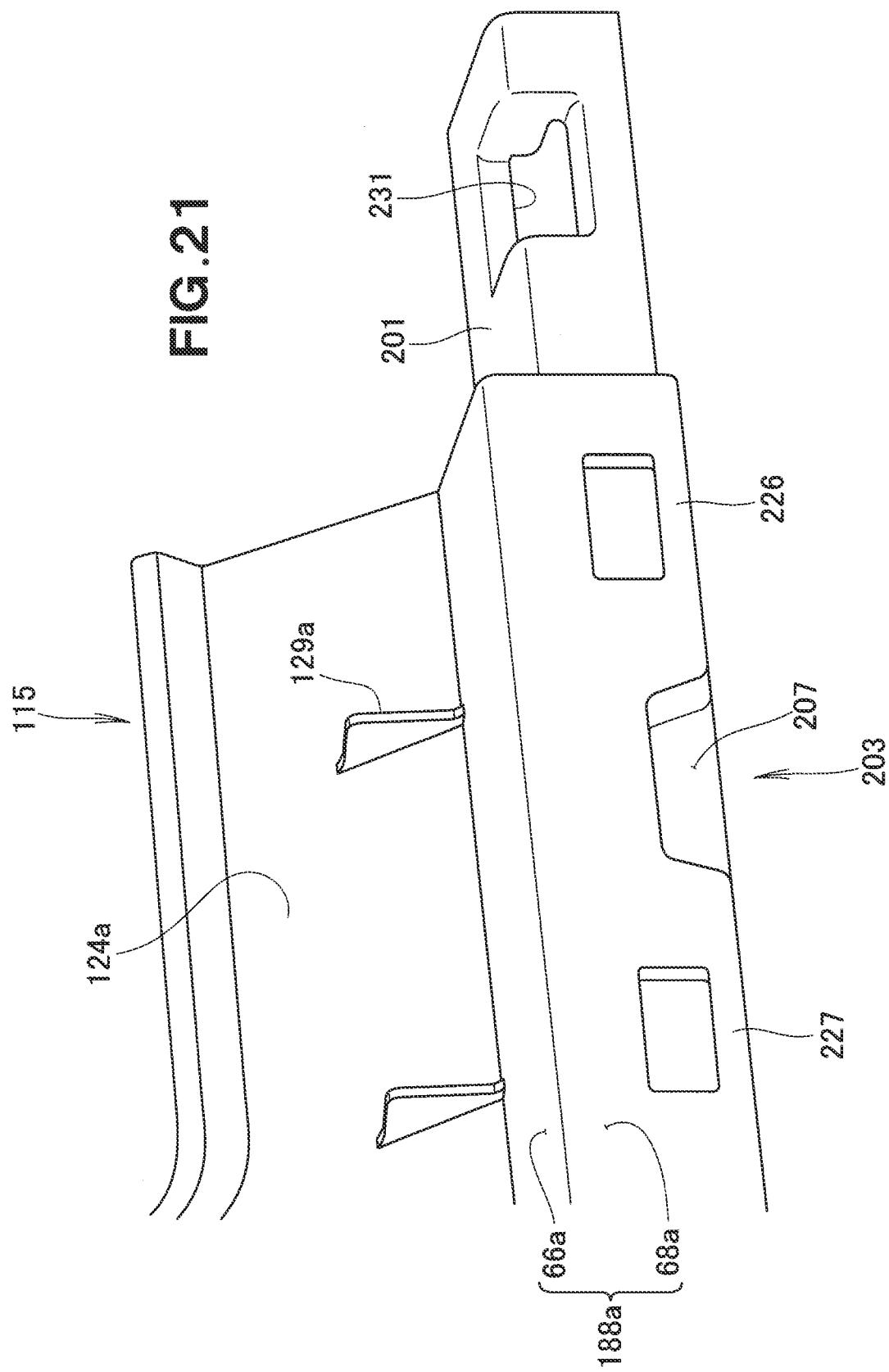
FIG. 21 is a perspective view taken in the direction of arrow 21 of FIG. 12.
Figure 22:
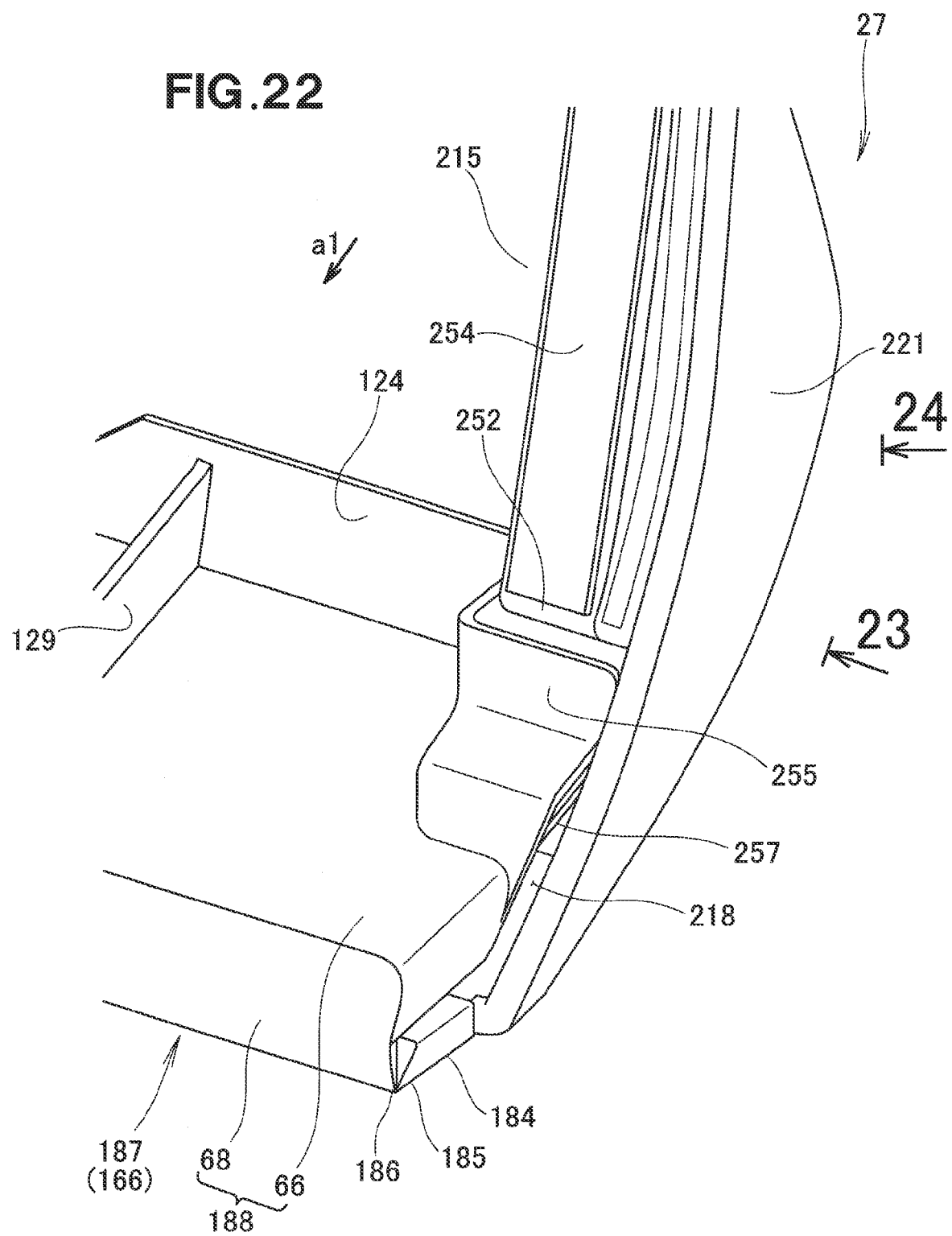
FIG. 22 is a perspective view taken in the direction of arrow 22 of FIG. 12.
Figure 23:
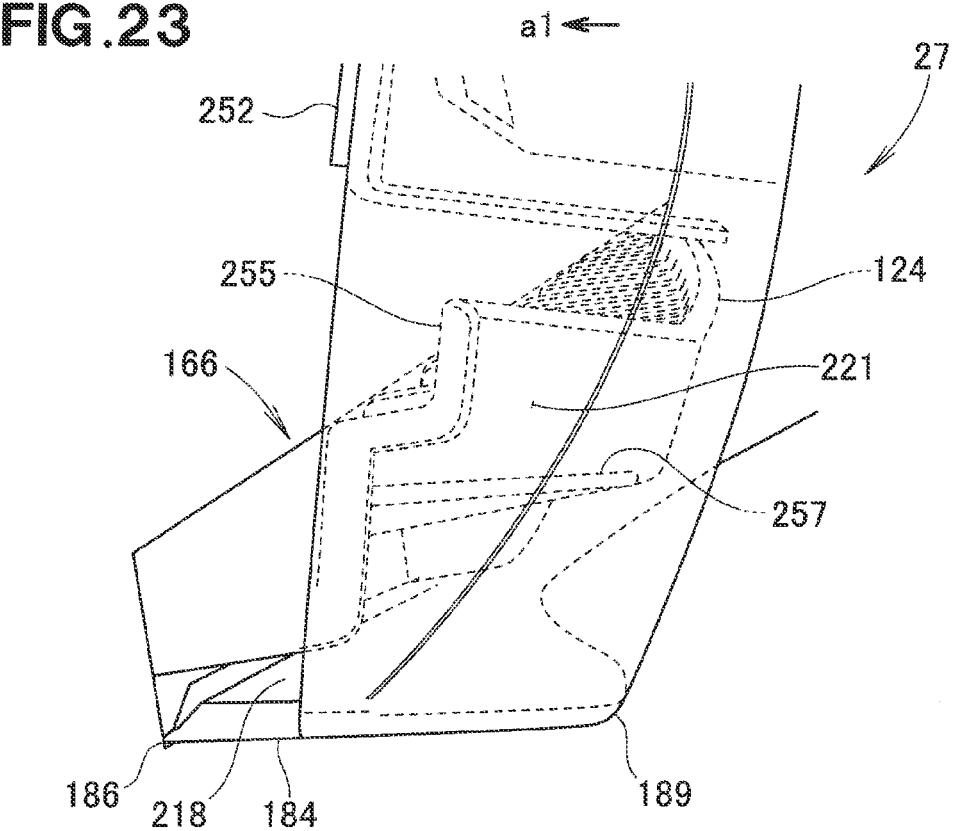
FIG. 23 is a view taken in the direction of arrow 22 of FIG. 22.
Figure 24:
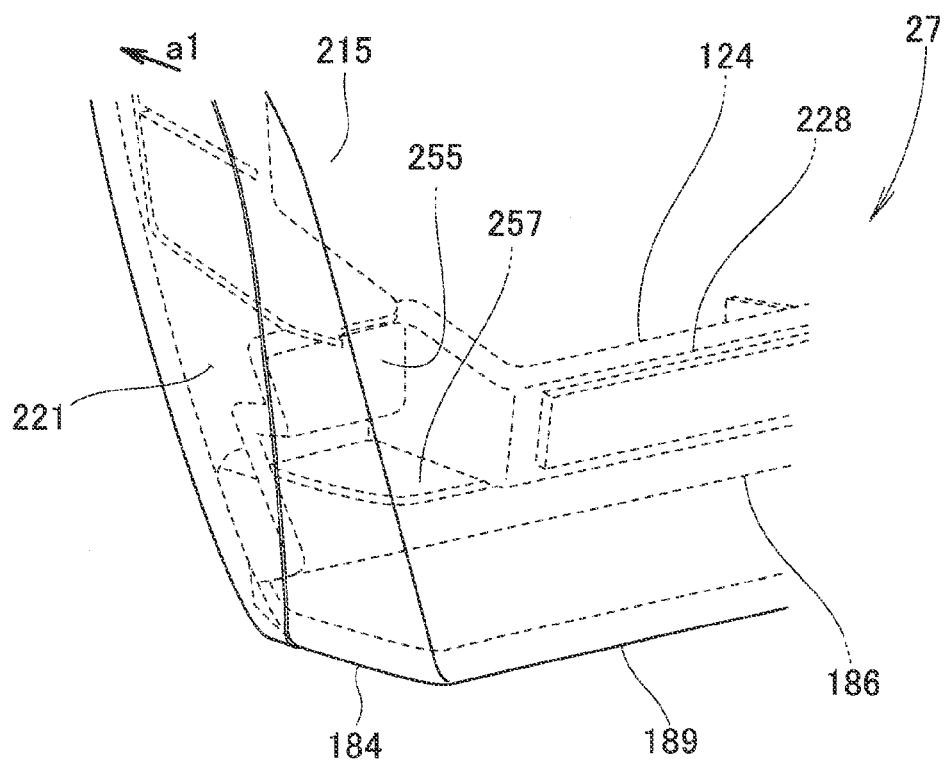
FIG. 24 is a perspective view taken in the direction of arrow 24 of FIG. 22.

As shown in FIGS. 12(b) and 21, the superposition sections 201 are located on opposite ends, in the front-rear direction of the vehicle body, of the inner wall member 115. Further, as shown in FIG. 17, the superposition sections 201 are each located within a corresponding one of the first closed section parts 187 and superposed on the inner wall 188.

As shown in FIGS. 15 to 17 and 21, the above-mentioned locking section 231 (opening locking section 231) is in the form of a through-hole formed in the superposition section 201 of the inner wall member 115. The above-mentioned engaging claw section 232 (projecting claw section 232) projects from the wall section 68 of the exterior member 27 into the first closed section part 187 and has a claw at its distal end. The superposition section 201 is fitted in the first closed section part 187, but also the engaging claw section 232 is engaged by the locking section 231 (i.e., by the edge of the through-hole 231).

The reason why the inner wall member 115 has the superposition sections 201 is as follows. As shown in FIGS. 12(a) and 12(b), the inner wall member 115 is fitted between respective one ends 245 and 246 of the two first closed section parts 187. Slight gaps might exist between the opposite ends 243 and 244, in the front-rear direction, of the inner wall member 115 and the ends 245 and 246 of the two first closed section parts 187. In order to increase the strength of the exterior member 27 with the first and second closed section parts 187 and 197, it is preferable that the first and second closed section parts 187 and 197 extend substantially continuously with each other.

For this reason, the inner wall member 115 has the superposition sections 201 extending from the opposite ends 243 and 244 into the two first closed section parts 187. With the superposition sections 201 fitted in the first closed section parts 187 in the aforementioned manner, the second closed section part 197 can be positioned relative to the first closed section parts 187. Further, the first and second closed section parts 187 and 197 are joined to one another sufficiently firmly by means of the superposition sections 201 and separate-member joining mechanisms 203. Thus, even in the case where there are slight gaps exist between the inner wall member 115 and the two first closed section parts 187, the first and second closed section parts 187 and 197 extend substantially continuously with each other to constitute the single "closed section part 166". Thus, the exterior member 27 can have a sufficient strength.

When external force (load) has acted on the inner wall member 115, such as when the door 12 has been closed, the external force transmits from the inner wall member 115 to the first closed section parts 187 by way of the superposition sections 201 and separate-member joining mechanisms 203. Because the first and second closed section parts 187 and 197 are joined to one another sufficiently firmly by means of the superposition sections 201 and separate-member joining mechanisms 203, relative positional deviation due to the external force can be prevented.

The following describe a manner in which the lower end of the inner wall member 115 is mounted on the exterior member 27 by means of the separate-member joining mechanism 203.

First, as indicated by imaginary line in FIG. 17, the exterior member 27 is provided in the same state as molded, i.e. with the inner wall 188 opened relative to the exterior member body 165.

Then, adhesive agent 228 is applied to the joining flange section 124a of the inner wall member 115 shown in FIG. 18.

After that, the first and second abutment restriction sections 226 and 227 are fitted in the horizontal grooves of the first and second U-shaped restriction sections 224 and 225 as shown in FIG. 18 with the engagement section 207 engaged by the locking claw 205 shown in FIG. 19.

Then, as shown in FIG. 17, the entire inner wall member 115 is turned toward the reverse surface 177 of the exterior member 27 (i.e., in a direction of arrow b1). Thus, as shown in FIG. 18, the first and second abutment restriction sections 226 and 227 are fitted in the horizontal grooves of the first and second U-shaped restriction sections 224 and 225, and substantially simultaneously therewith, the joining flange section 124a is adhered to the reverse surface 177 by means of the adhesive agent 228. In this manner, the second closed section part 197 is formed.

After that, adhesive agent 228 is applied to the joining flange section 124 shown in imaginary line in FIG. 17. Note that an adhesive tape may be attached to the joining flange 124 without the adhesive agent 228 being used.

Then, the inner wall 188 is turned about the bent section 186 toward the reverse surface 177 of the exterior member 27 (i.e., in the direction of arrow b1), during which the engaging claw section 232 is brought into engagement by the locking section 231 (i.e., by the edge of the through-hole 231). Simultaneously, the inner wall 188 is brought into superposition on the superposition section 201 of the inner wall member 115.

Then, the joining flange section 124 is superposed on the reverse surface 177 by the inner wall 188 being further turned. Thus, as indicated by solid line in FIG. 17, the joining flange section 124 is adhered to the reverse surface 177 by means of the adhesive agent 228. In this manner, the first closed section part 187 is formed. As a consequence, the superposition section 201 is fitted in the first closed section part 187 and mechanically joined to the latter.

Thus, operation for assembling the lower end of the inner wall member 115 to the exterior member 27 is completed. Namely, the lower end of the inner wall member 115 is joined to the exterior member 27 through "mechanical joint", "adhesive joint" or a combination of the "mechanical joint" and "adhesive joint".

Figure 10:
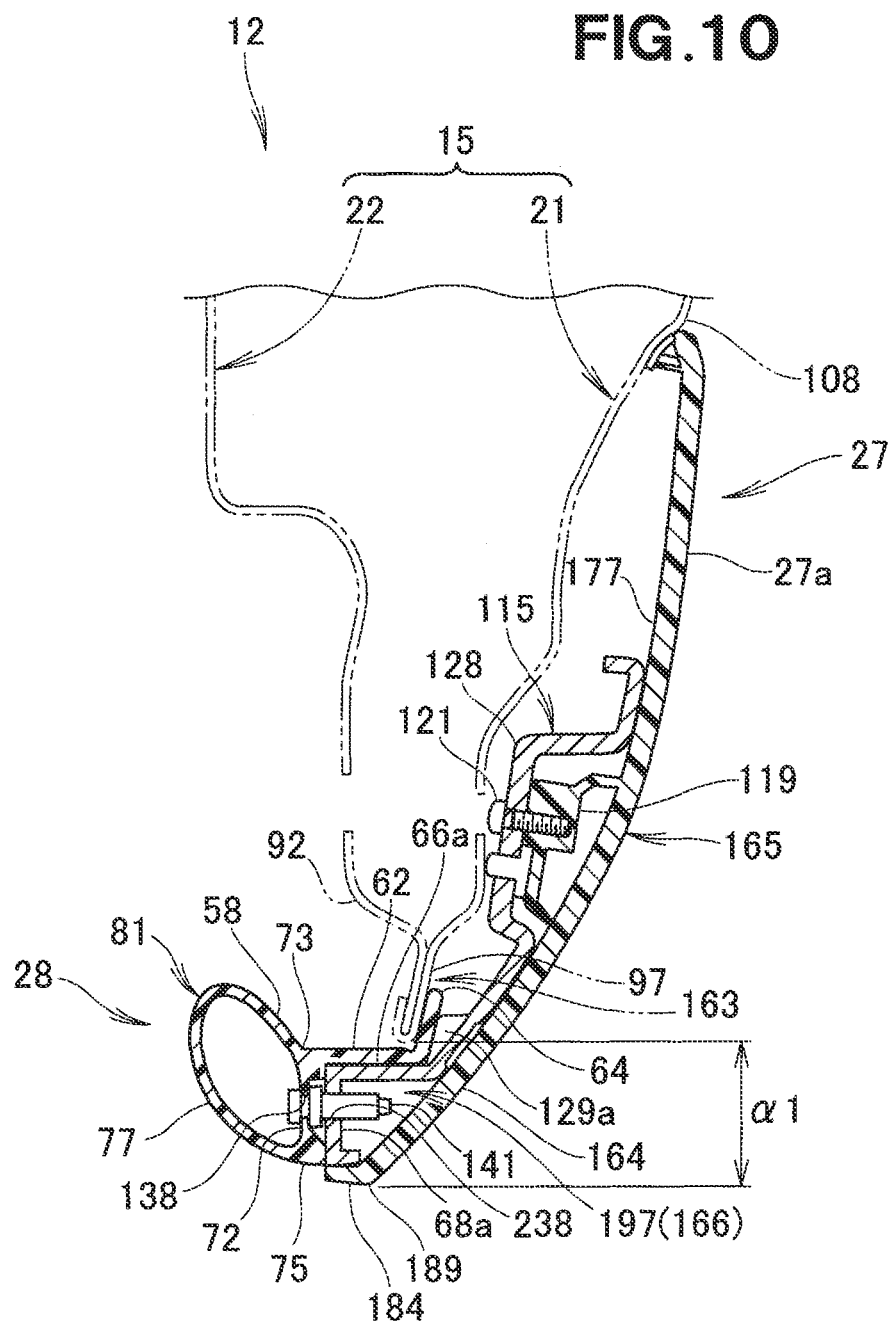
FIG. 10 is a sectional view taken along line 10-10 of FIG. 7.

An upper portion of the inner wall member 115 is mounted on the exterior member 27 in the following manner. As shown in FIGS. 10 and 13, one lug (fixing section) 119 is formed on the reverse surface 177 of the exterior member body 165 and protrudes into the door body 15, i.e. toward the inner wall member 115. The inner wall member 115 has a second fastening section 128 recessed to allow the lug 119 to be fitted therein. The second fastening section 128 is superposed on and fastened to the distal end surface of the lug 119 by means of a screw 121. In this manner, the inner wall member 115 is mounted on the exterior member 27.

The inner wall member 115 is mounted on the door body 15 in the following manner. As shown in FIGS. 6, 7 and 13, the outer door panel 21 has the one clipping hole 111 formed through the thickness thereof. A first fastening section 127 is formed on the reverse surface of the inner wall member 115 and protrudes toward the clipping hole 111. The first fastening section 127 is superposed on and fastened to the clipping hole 111 by means of a clip 122 and a screw 95. In this manner, the inner wall member 115 is mounted on the door body 15.

The exterior member 27 and the inner wall member 115 are formed by separate resin-molding molds. In the mold for molding the exterior member 27, a gate is formed in a cavity portion for forming the flange section 184, and this gate is in communication with a flow path (sprue) into which resin flows directly from a nozzle of an injection molding machine. Thus, there would be left a mark of the gate on the flange section 184 of the molded exterior member 27.

The following describe in detail the flange section 184. As shown in FIG. 6, the seal member 28 (door seal 28) is capable of contacting and sealing the frame section 41, defining the door opening 161, when the door 12 is closed. The seal member 28 (door seal 28), which is a member elongated in the front-rear direction of the vehicle body along the exterior member 27 (see FIG. 3), is integrally formed of a material, such as rubber, having elasticity or flexibility. The seal member 28 is attached to the extension section 164 of the exterior member 27, i.e. to the end surface 71 (seal mounting surface 71) of the closed section part 166. The seal member 28 includes a slant section 58, a drainage sealing section 62, an outer surface sealing section 64, a seal mounting section 72 and a lower half section (seal's lower half section) 77.

The slant section 58 is located closer to the frame section 41 than the drainage hole 57 when the door 12 is closed (in the closed position). The slant section 58 is opposed to the drainage hole 57 and slants downward toward the extension section 164. Namely, the slant section 58 slants in the thickness direction of the door body 15 in such a manner that its upper end is located farther from the door body 15 than its lower end.

In other words, the slant section 58 is opposed to the drainage hole 57, but also at least its portion located closer to the interior of the vehicle than the drainage hole 57 slants toward the interior of the vehicle as its height increases, as shown in FIG. 6. Namely, the slant section 58 slants in such a manner that its upper end (free end) is located near the end 171 of the sealing surface 168 closer to the door opening 161 when the door 12 is in the closed position. The slanting surface of the slant section 58 lies substantially on an extension of the slanting surface of a slanting wall section 172. Thus, drainage water Wa discharged via the drainage hole 57 can be directed in a direction of arrow a3.

The drainage sealing section 62 (projecting section 62) connects integrally to the slant section 58. The drainage sealing section 62 extends from the lower end of the slant section 58 toward the door body 15 and extends beneath the drainage hole 57 to the lower edge 54 of the door body 15. As shown in FIGS. 6 and 17, the drainage sealing section 62 extends from a seal section 81, along the upper surface of the seal backup portion 66, 66a (lower plate portion 66, 66a), to the rib 129, 129a. The reverse surface 65 of the drainage sealing section 62 (see FIG. 9) is supported by being superposed on the seal backup portion 66, 66a.

The outer-surface sealing section 64 extends upward from the distal end of the drainage sealing section 62 (extension section 62). Near the lower end 54 of the door body 15, the outer-surface sealing section 64 is sandwiched by the outer surface 53 of the door body 15 and the rib 129, 129a of the exterior member 27.

In other words, as shown in FIG. 6, the outer-surface sealing section 64 connects to the drainage sealing section 62 and is located outwardly (in a direction of arrow a2 in FIG. 6) of the lower edge 54 of the door body 15 and kept in firm contact with the outer surface 53a near the lower edge 54 by being pressed by the exterior member 27.

Further, as shown in FIGS. 6 and 9, the seal half section 77 (another slant section 77) extends internally from the lower end 75 of the seal mounting section 72 to the upper end (free end) of the slant section 58 while bulging downwardly. The lower end 75 of the seal mounting section 72 is kept in abutting engagement with the lower end of the wall section 68 of the exterior member 27.

In other words, as shown in FIG. 6, the lower half section 77 extends from a portion, located downward of a corner portion 73a, of the seal mounting section 72 (i.e., from the lower end 75 of the seal mounting section 72) obliquely upward toward the end 171 of the sealing surface 168 closer to the door opening 161 and thereby integrally connects to the upper end of the slant section 58.

Figure 2:
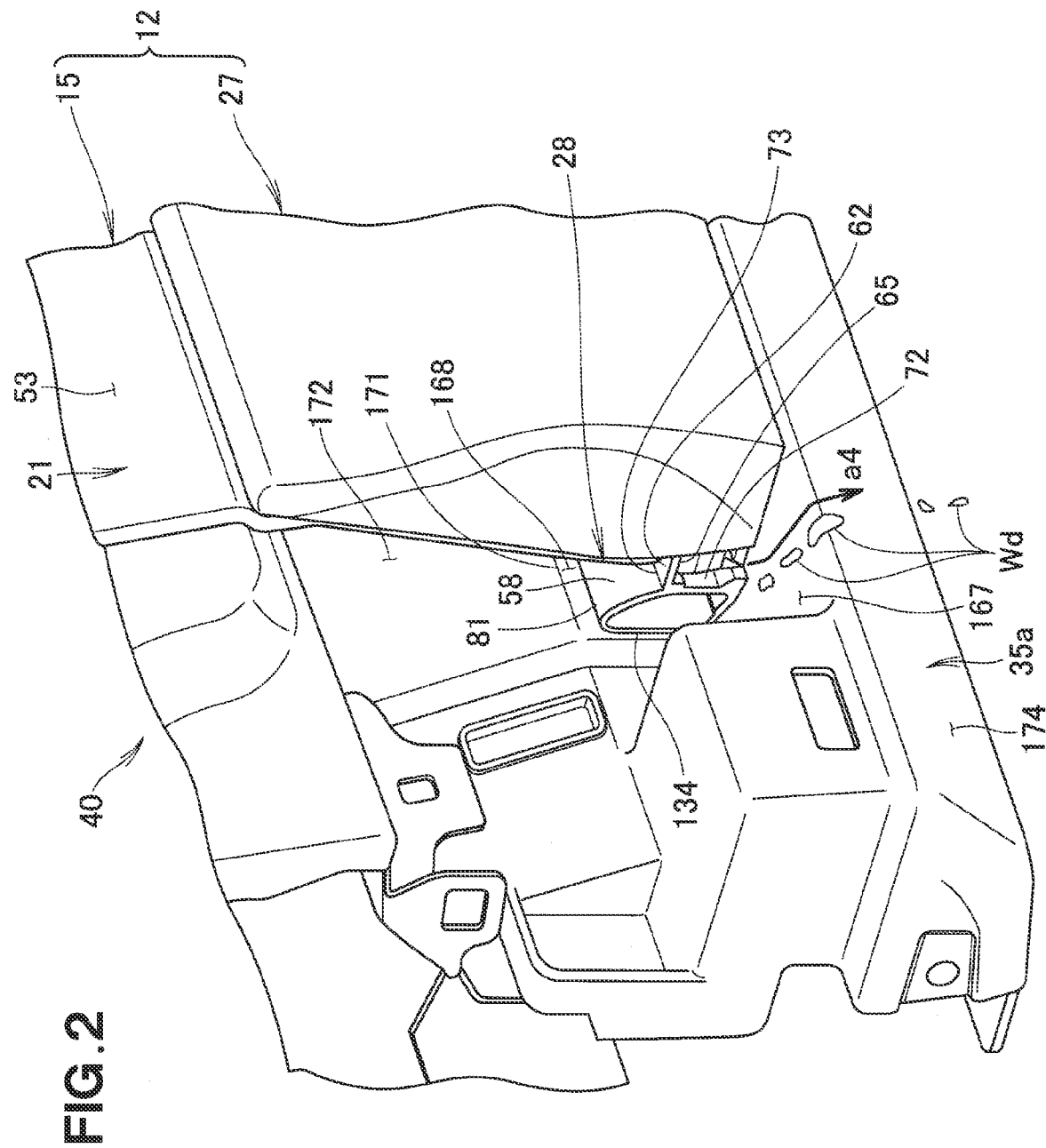
FIG. 2 is a perspective view taken in the direction of arrow 2 of FIG. 1.
Figure 4:
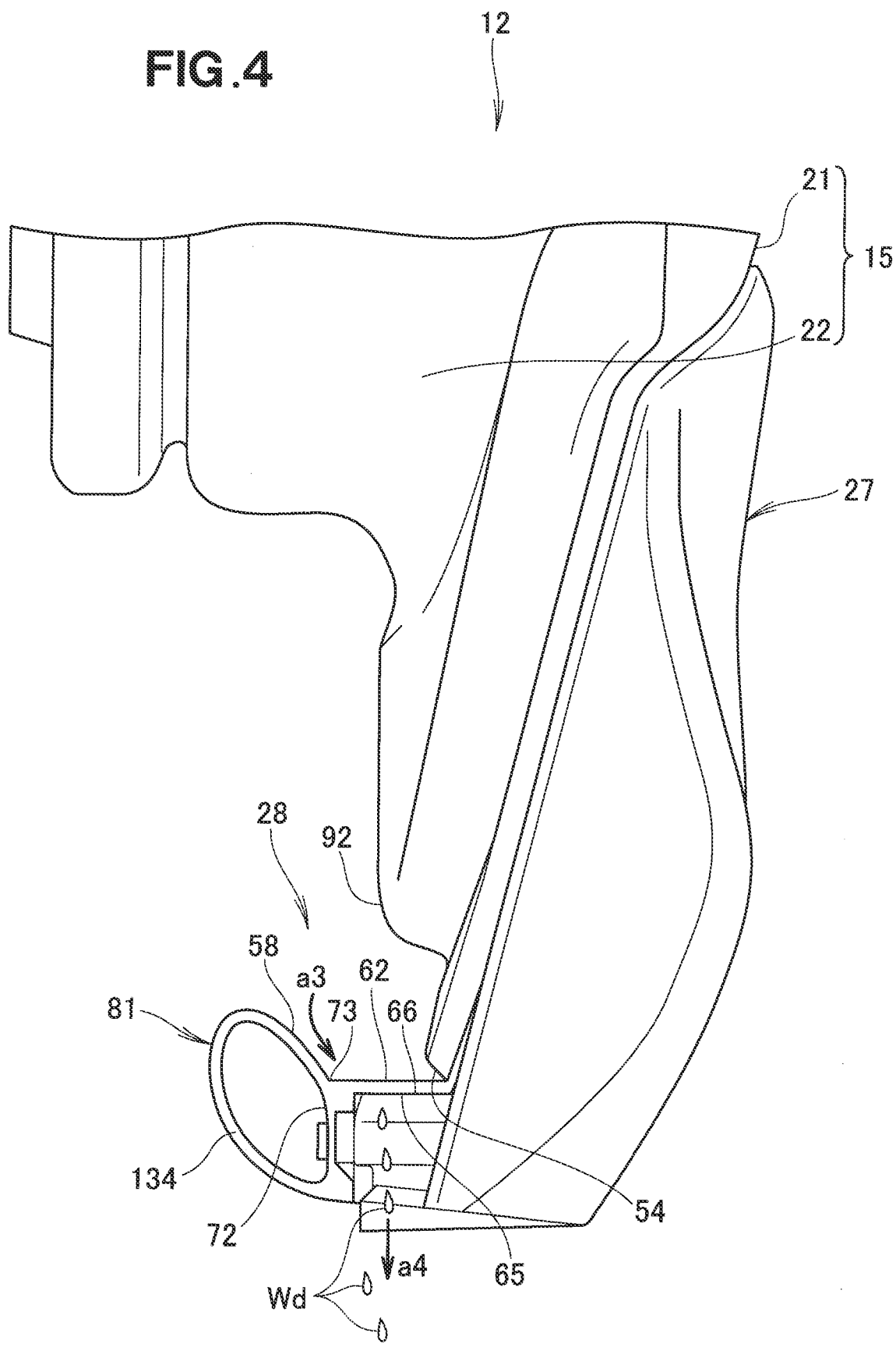
FIG. 4 is a view taken in the direction of arrow 4 of FIG. 3.
Figure 5:
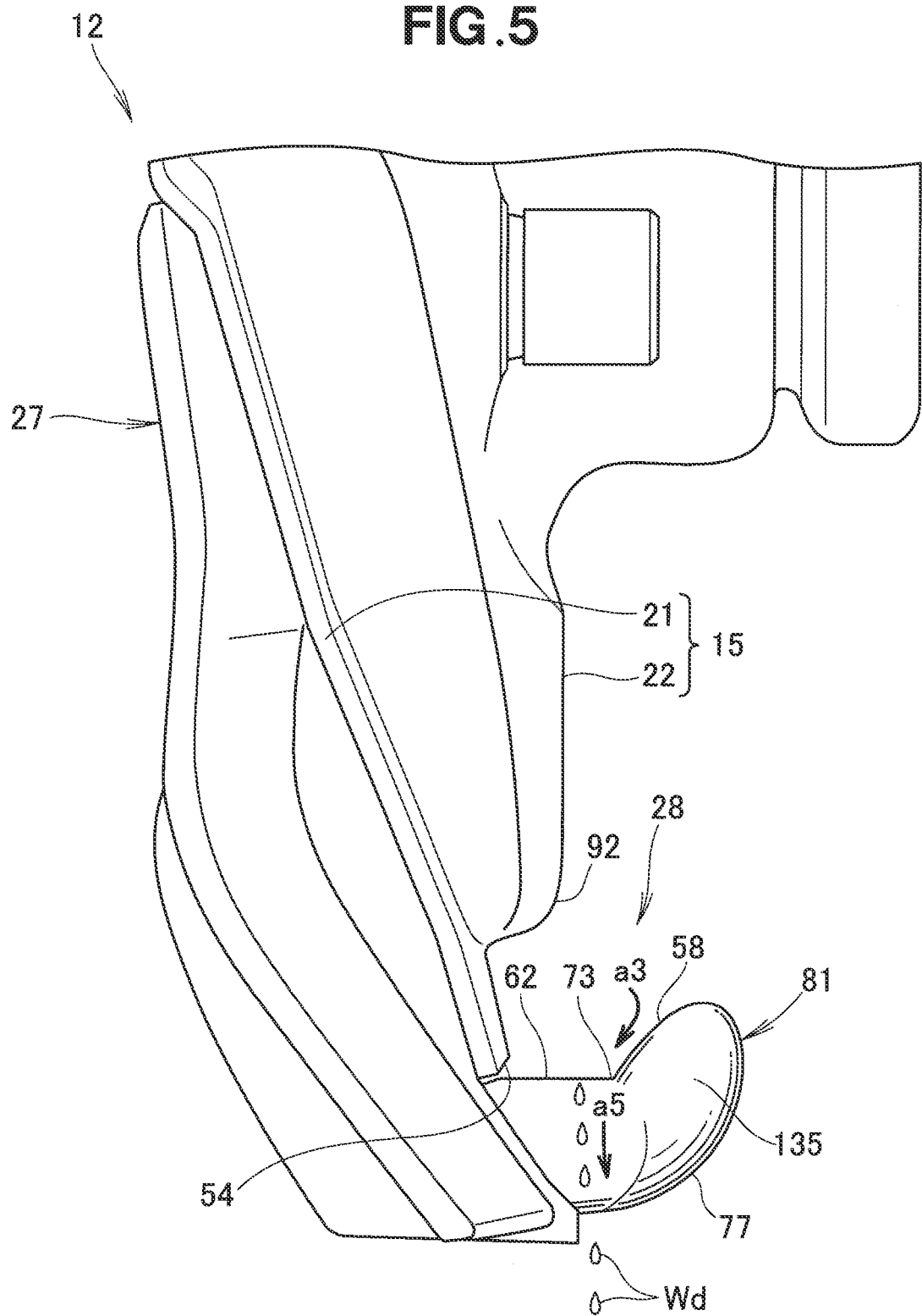
FIG. 5 is a view taken in the direction of arrow 5 of FIG. 3.

Of the seal member 28, the seal section 81 for contacting and sealing the frame section 41 of the door opening 161 is a hollow seal section having a hollow sectional shape, i.e. in the form of a tubular seal structure. The hollow seal section 81 integrally comprises the slant section 58, the seal mounting section 72 and the lower half section 77. As shown in FIG. 3, the hollow seal section 81 extends from the front end portion 131 to the rear end portion 132 of the door body 15. As the door 12 is closed, the hollow seal section 81 elastically deforms by being pressed against the sealing surface 168 so that it can firmly contact and seal the sealing surface 168, as shown in FIG. 6. Further, the hollow seal section 81 is open at its front end 134 as shown in FIGS. 2 and 4 and closed at its rear end 135 as shown in FIG. 5. Further, as shown in FIGS. 2 to 5, drainage water Wd from the interior of the door body 15 can be discharged to the outside through the front end 134 and rear end 135 of the seal member 28 as indicated by arrow a4 and arrow a5.

The seal mounting section 72 is a section of a vertical plate shape extending along the seal mounting surface 71 and superposed and mounted on the seal mounting surface 71. The seal mounting section 72 has its upper end formed integrally with a base portion 73 of the drainage sealing section 62 merging with the lower end of the slant section 58. In other words, the slant section 58 extends upward from the corner portion 73 (base portion 73) between the seal mounting section 72 and the drainage sealing section 62, as shown in FIG. 10.

As further shown in FIG. 10, the seal member 28 is mounted to the closed section part 166 (first and second closed section parts 187 and 197) by means of at least one seal fixing member 141, preferably a plurality of seal fixing members 141. Each of the seal fixing members 141 is, for example, in the form of a clip that is partly inserted in the interior of the closed section part 166 to be engaged by the closed section part 166.

More specifically, as shown in FIGS. 7, 10, 11 and 13, the seal mounting surface 71 of the closed section part 166 has a plurality of clipping holes 234, 238 formed therein. The clipping holes 234, 238 are formed substantially in a series in the front-rear direction of the vehicle. In the first closed section part 187, for example, a plurality of the clipping holes 234 are formed through the wall thickness thereof. In the second closed section part 197, a plurality of the clipping holes 238 are formed through the wall thickness thereof.

Further, as shown in FIG. 9, the seal member 28 has a recessed section 137 in its surface facing the seal mounting surface 71. The seal member 28 has a plurality of clipping holes 138 (FIG. 10) formed through the thickness of the recessed section 137. The plurality of clipping holes 138 are each formed in a size capable of grasping the clip 141. Namely, a plurality of the clips 141 are fitted in the respective clipping holes 234, 238, so that the seal member 28 is mounted to the closed section part 166.

Embodiment 2

Next, with reference to FIG. 25, a description will be given about a second embodiment of the vehicle door assembly of the present invention, which is characterized in that the seal member 28 provided in the first embodiment shown in FIGS. 1 to 24 is replaced with a seal member 28A shown in FIG. 25. The other structural elements than the seal member 28A are similar to those in the first embodiment shown in FIGS. 1 to 24 and will not be described here to avoid unnecessary duplication.

Figure 25:
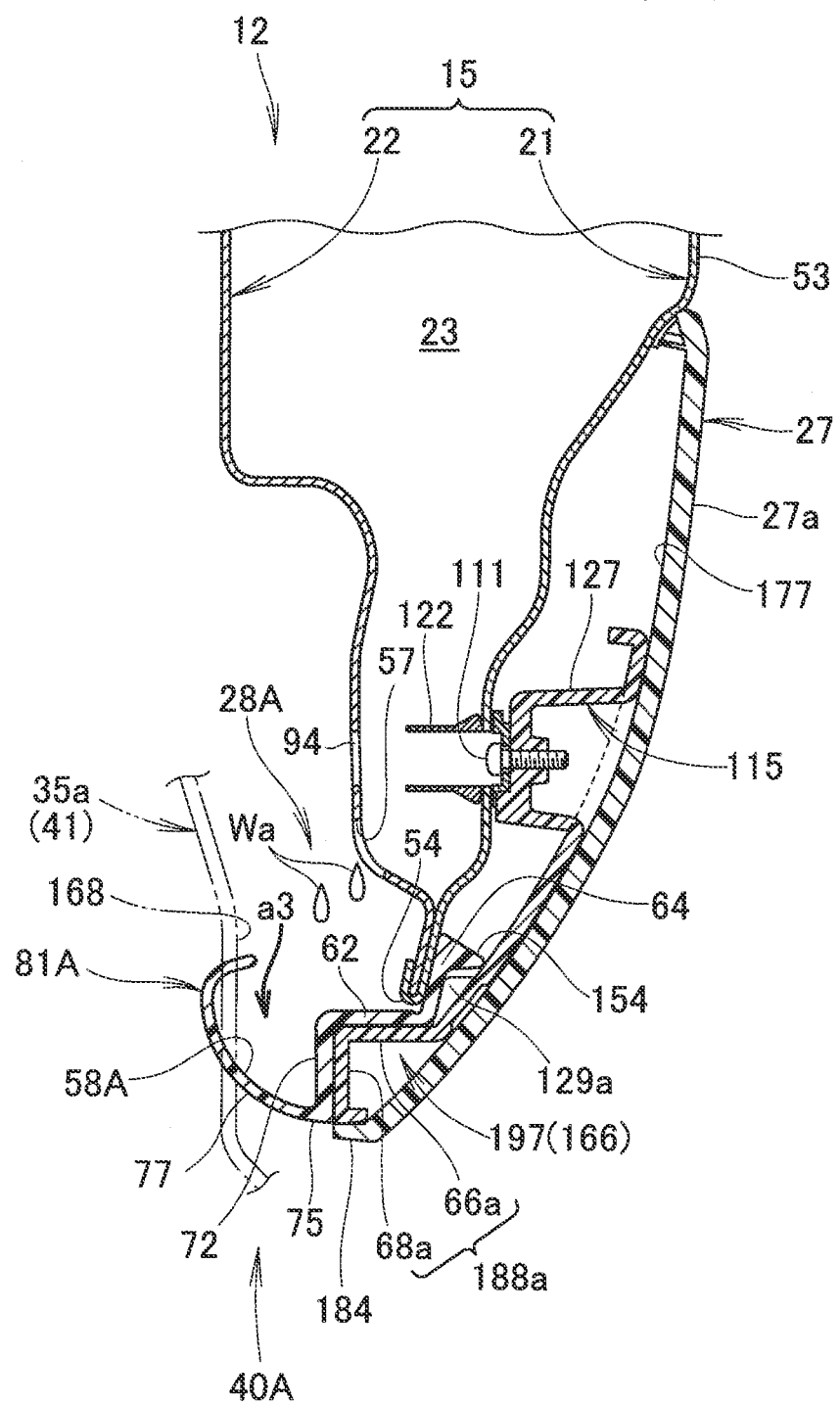
FIG. 25 is a sectional view showing, from the front of the vehicle, a second embodiment of the vehicle door assembly of the present invention.

More specifically, as shown in FIG. 25, a seal section 81A of the seal member 28A for contacting and sealing the frame section 41 of the door opening 161 is formed in a substantially U sectional shape opening upward. The seal section 81A integrally comprises a slant section 58A, the seal mounting section 72 and the lower half section 77. As the door 12 is closed, the hollow seal section 81A elastically deforms by being pressed against the sealing surface 168 so that it can firmly contact and seal the sealing surface 168

The upper opening of the seal section 81A faces the drainage hole 57 when the door is in the closed position. When the door is in the closed position, the inner surface 58A of the seal section 81A is located closer to the frame section 41 than the drainage hole 57. The inner surface 58A is opposed to the drainage hole 57 and slants downward toward the extension section 164. Namely, the sinner surface 58A slants in the thickness direction of the door body 15 in such a manner that its upper end is located farther from the door body 15 than its lower end. Hereinafter, the inner surface 58A of the seal section 81A will be referred to as "slant section 58A".

In other words, the slant section 58A is opposed to the drainage hole 57, but also at least its portion located closer to the interior of the vehicle than the drainage hole 57 slants toward the interior of the vehicle as its height increases. Namely, the slant section 58A slants in such a manner that its upper end (free end) is located near the end 171 of the sealing surface 168 closer to the door opening when the door 12 is in the closed position. The slanting surface of the slant section 58A lies substantially on an extension of the slanting surface of the slanting wall section 172. Thus, drainage water Wa discharged via the drainage hole 57 can be directed in a direction of arrow a3. A come-off preventive protrusion 154 is formed on the upper end edge of the outer-surface sealing section 64.

The second embodiment of the vehicle door assembly 40A can achieve the same behavior and advantageous benefits as the above-described first embodiment of the vehicle door assembly 40A. The second embodiment of the vehicle door assembly 40A is advantageous in that the seal member 28A can be manufactured with ease and that it can be reduced in weight.

The door in the vehicle door assembly 40, 40A of the present invention is not limited to application as a side door, such as the front door 12 or rear door 46, and it may be a tail gate, bonnet (hood) or the like. Further, the door in the vehicle door assembly 40, 40A of the present invention is not limited to a swing door and may be a slide door.

Furthermore, a place on which the exterior member 27 is mounted is not limited to a lower section of the outer surface of the door body 15 and may be a rear or upper section of the outer surface of the door body 15.

Furthermore, the present invention is not limited to the aforementioned construction where the inner wall member 115 is disposed on a middle portion, in the front-rear direction of the vehicle, of the exterior member 27, and the inner wall member 115 may be disposed on a front or rear portion in the front-rear direction of the vehicle, of the exterior member 27. Furthermore, such inner wall members 115 may be disposed on a plurality of portions of the exterior member 27.

Furthermore, whereas the "mechanical joint" has been described as a joint provided by the engaging claw section 232, the present invention is not so limited, and the "mechanical joint" may be a joint made by screwing a bolt into a nut (i.e., joint by a screw), joint by a rivet, a joint by a tack, such as a clip engaged without a thread being formed in a shaft thereof, a joint using press fitting, a joint by a hand using a band-shaped steel plate and steel wire, a joint by a spring, a joint by a stop ring, or a joint by a sandwiching metal member like a slip or clamp.

INDUSTRIAL APPLICABILITY

The vehicle door assembly 40, 40A of the present invention is well suited for application to automotive vehicles.

LEGEND

11 ... vehicle, 12, 46 ... door, 13 ... vehicle body, 15 ... door body, 21 ... outer door panel, 22 ... inner door panel, 27 ... exterior member, 27a ... outer surface, 28, 28A ... seal member, 29 ... rib, 40, 40A ... vehicle door assembly, 41, 42 ... frame section, 53 ... outer surface of the door body (outer door panel), 54 ... lower edge of the door body, 57 ... drainage hole, 58 ... slant section, 62 ... projecting section (drainage sealing section), 64 ... outer-surface sealing section, 65 ... reverse surface of the drainage sealing section, 66 ... lower plate portion (seal backup portion), 68 ... wall section, 71 ... wall surface (end surface or seal mounting surface), 72 ... seal mounting section, 77, 77A ... lower half section, 81 ... seal section (hollow seal section), 85 ... edge of the inner door panel, 97 ... edge of the outer door panel, 115 ... inner wall member, 124 ... joining flange section, 129, 129a ... rib, 141 ... seal fixing member, 161 ... door opening (get-in/out opening), 163 ... peripheral edge section of the door body, 164 ... extension section, 165 ... exterior member body, 166 ... closed section part, 167 ... door-facing surface, 168 ... sealing surface, 171 ... end of the sealing surface closer to the door opening, 172 ... slant section, 173 ... start point where the edges of the door panels start being superposed on each other, 177 ... reverse surface, 184 ... flange section, 186 ... bent section, 187 ... first closed section part, 187a, 187b ... portions where spaced-apart distance is greater than a predetermined distance; 188 ... inner wall, 189 ... edge of the exterior member body, 195 ... remaining portion, 197 ... second closed section part, 201 ... superposition section, 203 ... separate-member joining mechanism, 205 ... locking claw, 206 ... locking surface, 207 ... engagement section, 215 ... one end, 218 ... opening, 221 ... end wall section, 252, 253 ... body end joint section, 255 ... evacuation section, 257 ... shield wall, Es ... distance, Wa ... water, Wd ... drainage water, α1 ... extended distance, β1, β2 ... predetermined distance, βf, βf ... distance from the edge to the bent section of the exterior member body

The invention claimed is:
1. A vehicle door assembly including a vehicle door for opening and closing a door opening of a vehicle body, the vehicle door comprising:
a door body of a hollow shape including an outer door panel and an inner door panel;
an exterior member formed of a softer material than the door body and mounted on an outer surface of the outer door panel to cover at least a part of the outer surface of the outer door panel; and
a seal member capable of contacting and sealing a frame section defining the door opening, when the door is closed,
the exterior member comprising;
an exterior member body covering an outer surface of the outer door panel;
an extension section extending from the exterior member body outwardly beyond an edge of the door body along the outer surface of the outer door panel; and
a closed section part formed in a closed section shape on a reverse surface of the extension section, the seal member being mounted on the closed section part, the closed section part being structurally independent from the seal member and being formed solely by the exterior member.

2. The vehicle door assembly according to claim 1, wherein the frame section has a door-facing surface capable of facing the edge of the door body when the door is closed, and
the closed section part is disposed to be positioned between the edge of the door body and the door-facing surface when the door is closed.

3. The vehicle door assembly according to claim 2, wherein the frame section has a sealing surface extending from the door-facing surface toward the door opening, and
the seal member is disposed to contact the sealing surface as the door is closed in a direction substantially perpendicular to the door opening.

4. The vehicle door assembly according to claim 3, wherein at least a part of an inner peripheral surface of the frame section comprises a slanting wall section inclined from an end of the sealing surface closer to the door opening toward a center of the door opening and toward an interior of the vehicle, and
wherein, when the door is closed, the end of the sealing surface is located closer to the door-facing surface than a start point where an edge of the outer door panel and an edge of the inner door panel start being superposed on each other.

5. The vehicle door assembly according to claim 3, wherein at least a part of the outer peripheral surface of the frame section comprises a design wall section formed continuously with the door-facing surface, and
an outer surface of the design wall section is shaped such that it lies substantially flush with an outer surface of the exterior member when the door is closed.

6. The vehicle door assembly according to claim 1, wherein the closed section part has an end surface extending adjacent to an opposite side of the edge of the door body from the reverse surface of the extension section, and
the seal member is mounted on the end surface of the closed section part.

7. The vehicle door assembly according to claim 1, wherein the seal member is fixed to the closed section part by means of a seal fixing member, the seal fixing member is engaged by the closed section part by being partly inserted in an interior of the closed section part.

8. The vehicle door assembly according to claim 1, wherein the closed section part includes: a substantially horizontal lower plate portion disposed beneath the edge of the door body; a joining flange section extending upward from the lower plate portion and joined to a reverse surface of the exterior member body; and at least one rib formed on a corner between the lower plate portion and the joining flange section, and
the seal member includes: a seal section capable of contacting and sealing the frame section; a projecting section extending from the seal section, along an upper surface of the lower plate portion, to the rib; and an outer-surface sealing section extending upward from a distal end of the projecting section,
wherein the outer-surface sealing section is sandwiched by the outer surface of the outer door panel and the rib near a lower edge of the door body.

9. The vehicle door assembly according to claim 1, wherein the vehicle door is a door disposed to extend substantially vertically when the vehicle door is in a closed position,
the door body has at least one drainage hole formed therein for discharging water having entered an interior of the door body,
the drainage hole is located closer to the frame section than the lower edge of the door body when the door is closed,
the seal member includes a slant section slanting in a thickness direction of the door body, and a drainage sealing section connecting integrally to the slant section,
the slant section is located closer to the frame section than the drainage hole and opposed to the drainage hole and slants downward toward the extension section when the door is closed,
the drainage sealing section extends from a lower end of the slant section in a direction toward the door body and extends beneath the drainage hole to the lower edge of the door body, and
the exterior member includes a seal backup portion having a flat upper surface for supporting thereon a reverse surface of the drainage sealing section.

10. The vehicle door assembly according to claim 9, wherein the seal backup portion includes a wall section extending downward from an end, located remote from the door body, of the seal backup portion, a surface of the wall section opposite from the reverse surface of the extension section being provided as a seal mounting surface,
the seal member includes a seal mounting section shaped to extend along the seal mounting surface, and
the seal mounting section is superposed on and mounted on the seal mounting surface.

11. A vehicle door assembly including a vehicle door for opening and closing a door opening of a vehicle body,
the vehicle door comprising: a door body; and a resin-made exterior member covering an outer surface of the door body,
the exterior member comprising:
an exterior member body covering the outer surface of the door body;
a flange section extending from an edge of the exterior member body toward a peripheral edge section of the door body;
a bent section formed integrally with a distal end of the flange section and bendable in a thickness direction of the flange section;
an inner wall formed integrally with the bent section and bendable about the bent section toward a reverse surface of the exterior member body; and
a joining flange section formed at a distal end of the inner wall and capable of being joined to the reverse surface of the exterior member body,
wherein the bent section extends straight along the distal end of the flange section,
the exterior member body and the flange section together constitute a first closed section part of a closed sectional shape when the joining flange section is joined to the reverse surface of the exterior member body,
a spaced-apart distance from the edge of the exterior member body to the bent section differs among portions of the exterior member body,
the bent section and the inner wall are provided only in portions of the exterior member body where the spaced-apart distance is greater than a predetermined distance,
an inner wall member separate from the inner wall is mounted on the reverse surface of a remaining portion where the bent section and the inner wall are not provided, and
the inner wall member and the exterior member body together constitute a second closed section part of a closed sectional shape continuous with the first closed section part.

12. The vehicle door assembly according to claim 11, wherein the inner wall member includes a superposition section superposed on the inner wall of the exterior member, and the superposition section is joined to the inner wall.

13. The vehicle door assembly according to claim 12, wherein the joining flange section is joined to the reverse surface of the exterior member body by adhesive bonding, and
the superposition section is joined to the inner wall of the exterior member by a mechanical joint.

14. The vehicle door assembly according to claim 12, wherein the superposition section is a section located in an interior of the first closed section part and superposed on the inner wall.

15. The vehicle door assembly according to claim 12, wherein the exterior member further includes a separate-member joining mechanism for joining the inner wall member to the exterior member body, and
the separate-member joining mechanism is located near the superposition section.

16. The vehicle door assembly according to claim 15, wherein the separate-member joining mechanism includes:
a locking claw projecting from the flange section toward the inner wall member;
a locking surface that is one surface of the locking claw and that faces the reverse surface of the exterior member body; and
an engagement section formed on the inner wall member for locking engagement by the locking surface, and
wherein the inner wall member is joined to the exterior member body by being sandwiched between the reverse surface of the exterior member body and the locking surface.

17. The vehicle door assembly according to claim 16, wherein the engagement section is formed in a shape recessed from a surface, abutting against the locking surface, of the inner wall member toward the reverse surface of the exterior member body.

18. The vehicle door assembly according to claim 11, wherein the exterior member further includes an end wall section extending from at least one end, in an extending direction of the bent section extending straight, of the exterior member body toward the door body, and
an opening, located near the one end of the exterior member body, of the first closed section part is covered with the end wall section.

19. The vehicle door assembly according to claim 11, wherein the exterior member further includes a body end joint section that joins the exterior member body to the door body, and
the joining flange section includes an evacuation section formed in such a manner as to bypass the body end joint section, without interfering with the body end joint section, when the joining flange section is joined to the exterior member body.

20. The vehicle door assembly according to claim 19, wherein the exterior member further includes a shield wall closing up a gap between the reverse surface of the exterior member body and the evacuation section.

21. A vehicle door assembly including a vehicle door for opening and closing a get-in/out opening of a vehicle body, the vehicle door comprising:
a door body of a hollow sectional shape;
an exterior member mounted on a lower section of an outer surface of the outer door body and including an extension section extending downward beyond a lower edge of the door body; and
a seal member mounted on the extension section and capable of contacting and sealing a frame section, defining the get-in/out opening, when the door is closed,
wherein the door body has at least one drainage hole for discharging water having entered an interior of the door body,
the seal member includes a slant section located closer to the frame section than the drainage hole when the door is closed, and
the slant section is opposed to the drainage hole and slants downward toward the extension section.

22. The vehicle door assembly according to claim 21, wherein the drainage hole is located closer to the frame section than the lower edge of the door body when the door is closed,
the seal member includes a drainage sealing section connecting integrally to the slant section, and
the drainage sealing section extends from a lower end of the slant section in a direction toward the door body and extends beneath the drainage hole to the lower edge of the door body.

23. The vehicle door assembly according to claim 22, wherein the seal member includes an outer-surface sealing section extending upward from a distal end of the drainage sealing section, and,
the outer-surface sealing section is sandwiched between the outer surface of the outer door panel and the exterior member near the lower edge of the door body.

24. The vehicle door assembly according to claim 22, wherein the exterior member includes a seal backup portion having a flat upper surface for supporting thereon a reverse surface of the drainage sealing section.

25. The vehicle door assembly according to claim 24, wherein the seal backup portion includes a wall section extending downward from an end, located remote from the door body, of the seal backup portion, a surface of the wall section opposite from the reverse surface of the extension section being provided as a seal mounting surface,
the seal member includes a seal mounting section shaped to extend along the seal mounting surface, and
the seal mounting section is superposed on and mounted on the seal mounting surface.

26. The vehicle door assembly according to claim 25, wherein the seal mounting section has an upper end formed integrally with a base portion of the drainage sealing section merging with the lower end of the slant section.

27. The vehicle door assembly according to claim 26, wherein, of the seal member, a seal section for contacting and sealing the frame section is a hollow seal section having a hollow sectional shape, and
the hollow seal section is formed integrally to integrally include the slant section, the seal mounting section and a lower half section extending from a lower end of the seal mounting section to an upper end of the slant section.

28. The vehicle door assembly according to claim 24, wherein the exterior member includes:
a joining flange section extending upward from an end, adjacent to a reverse surface of the exterior member, of the seal backup portion and joined to the reverse surface of the exterior member; and
at least one rib formed on a corner between the seal backup portion and the joining flange section, and
wherein the seal member includes an outer-surface sealing section extending upward from a distal end of the drainage sealing section, and the outer-surface sealing section is sandwiched by the outer surface of the door body and the rib near the lower edge of the door body.

* * * * *